(12) United States Patent
Koshima

(10) Patent No.: US 11,927,914 B2
(45) Date of Patent: Mar. 12, 2024

(54) ELECTROPHOTOGRAPHIC TONER BINDER, AND TONER COMPOSITION

(71) Applicant: SANYO CHEMICAL INDUSTRIES, LTD., Kyoto (JP)

(72) Inventor: Takuya Koshima, Kyoto (JP)

(73) Assignee: SANYO CHEMICAL INDUSTRIES, LTD., Kyoto (JP)

(*) Notice: Subject to any disclaimer, the term of this patent is extended or adjusted under 35 U.S.C. 154(b) by 147 days.

(21) Appl. No.: 16/463,070

(22) PCT Filed: Dec. 13, 2017

(86) PCT No.: PCT/JP2017/044691
§ 371 (c)(1),
(2) Date: May 22, 2019

(87) PCT Pub. No.: WO2018/110593
PCT Pub. Date: Jun. 21, 2018

(65) Prior Publication Data
US 2019/0310564 A1 Oct. 10, 2019

(30) Foreign Application Priority Data
Dec. 14, 2016 (JP) .................. 2016-242202

(51) Int. Cl.
*G03G 9/087* (2006.01)
*C08F 220/18* (2006.01)
*C08F 220/68* (2006.01)

(52) U.S. Cl.
CPC ... *G03G 9/08706* (2013.01); *C08F 220/1818* (2020.02); *C08F 220/68* (2013.01); *G03G 9/087* (2013.01)

(58) Field of Classification Search
CPC ............. C08F 220/68; C08F 220/1818; G03G 9/08728
See application file for complete search history.

(56) References Cited

U.S. PATENT DOCUMENTS

| | | | | |
|---|---|---|---|---|
| 3,991,007 A | * | 11/1976 | Perronin | C08F 2/44 524/856 |
| 4,388,395 A | * | 6/1983 | Tsubuko | G03G 9/133 430/114 |
| 4,520,088 A | * | 5/1985 | Senga | G03G 9/08726 430/114 |
| 4,853,311 A | * | 8/1989 | Tavernier | G03G 9/08793 524/904 |
| 4,880,857 A | * | 11/1989 | Mori | B41M 5/395 524/548 |
| 5,114,820 A | | 5/1992 | Georges et al. | |
| 5,278,250 A | * | 1/1994 | Ohtani | B22F 1/0059 516/77 |
| 5,360,690 A | * | 11/1994 | Nakano | G03G 9/0904 430/108.9 |
| 5,460,915 A | * | 10/1995 | Nakanishi | G03G 9/08788 430/108.4 |
| 2004/0091805 A1 | * | 5/2004 | Qian | G03G 9/08728 430/109.3 |
| 2007/0166636 A1 | * | 7/2007 | Daimon | G03G 9/08711 430/109.3 |
| 2007/0298374 A1 | * | 12/2007 | Carlton | A61C 8/0089 433/173 |
| 2011/0020741 A1 | * | 1/2011 | Mizumori | G03G 9/08797 430/105 |

(Continued)

FOREIGN PATENT DOCUMENTS

CN 103154826 6/2013
EP 2 258 748 12/2010
(Continued)

OTHER PUBLICATIONS

Bandrup et al, Polymer Handbook 4th edition Tables 6-10, 2005, p. VII/688 to VII/713, Retrieved from https://app.knovel.com/hotlink/pdf/id:kt003S1XE2/polymer-handbook-4th/main-chain-carbon-polymers (Year: 2005).*

(Continued)

*Primary Examiner* — Ling Siu Choi
*Assistant Examiner* — David L Miller
(74) *Attorney, Agent, or Firm* — Wenderoth, Lind & Ponack, L.L.P.

(57) ABSTRACT

The present invention provides an electrophotographic toner binder containing, as a main component, a polymer whose constituent monomer is a monomer having an ethylenically unsaturated bond, the electrophotographic toner binder being excellent in low-temperature fixability, hot-offset resistance, and storage stability. The present invention provides an electrophotographic toner binder containing a polymer (A) containing a monomer (a) and a monomer (x) different from the monomer (a) as essential constituent monomers, wherein the monomer (a) is a (meth)acrylate having a C18-C36 acyclic hydrocarbon group, the polymer (A) has an acid value of 40 or less, and the polymer (A) satisfies the following relational expression (1):

$$1.1\ (cal/cm^3)^{0.5} \leq |SP(x)-SP(a)| \leq 8.0\ (cal/cm^3)^{0.5} \quad \text{relational expression (1):}$$

wherein SP(a) is the SP value of a structural unit derived from the monomer (a) constituting the polymer (A); and SP(x) is the SP value of a structural unit derived from the monomer (x) different from the monomer (a) constituting the polymer (A).

4 Claims, No Drawings

(56) References Cited

U.S. PATENT DOCUMENTS

| | | | |
|---|---|---|---|
| 2013/0034809 A1* | 2/2013 | Iwata | C08J 3/11 |
| | | | 430/114 |
| 2013/0108953 A1 | 5/2013 | Kawamura et al. | |
| 2013/0130165 A1* | 5/2013 | Kinumatsu | G03G 9/09364 |
| | | | 430/109.1 |
| 2013/0273469 A1 | 10/2013 | Akutagawa et al. | |
| 2015/0004539 A1* | 1/2015 | Watanabe | G03G 9/08793 |
| | | | 430/108.22 |
| 2015/0037727 A1 | 2/2015 | Fukudome et al. | |
| 2015/0177635 A1 | 6/2015 | Fukudome et al. | |
| 2020/0233327 A1* | 7/2020 | Honda | G03G 9/08711 |

FOREIGN PATENT DOCUMENTS

| | | |
|---|---|---|
| EP | 2 559 724 | 2/2013 |
| JP | 2-204755 | 8/1990 |
| JP | 6-175394 | 6/1994 |
| JP | 11-44967 | 2/1999 |
| JP | 11-327210 | 11/1999 |
| JP | 2000-352839 | 12/2000 |
| JP | 3212860 | 9/2001 |
| JP | 3458165 | 10/2003 |
| JP | 3492748 | 2/2004 |
| JP | 2004-163956 | 6/2004 |
| JP | 3596104 | 12/2004 |
| JP | 2010-97000 | 4/2010 |
| JP | 4493080 | 6/2010 |
| JP | 4677909 | 4/2011 |
| JP | 2011-94136 | 5/2011 |
| JP | 2011-095727 | 5/2011 |
| WO | 2009/119055 | 10/2009 |
| WO | WO-2019073731 A1 * | 4/2019 ............. G03G 9/087 |

OTHER PUBLICATIONS

Ahmad, Husain, "Solubility parameter of acrylamide series polymer though its Components and Group Contribution Technique" 1982, Journal of Macromolecular Science-Chemistry 17:4 585-600. (Year: 1982).*

International Search Report dated Jan. 23, 2018 in International (PCT) Patent Application No. PCT/JP2017/044691 with English Translation.

* cited by examiner

ELECTROPHOTOGRAPHIC TONER BINDER, AND TONER COMPOSITION

TECHNICAL FIELD

The present invention relates to an electrophotographic toner binder and a toner composition.

BACKGROUND ART

Electrophotographic toner binders for a heat fixing system which is an image fixing system commonly applied to devices such as copiers and printers are required to simultaneously provide properties such as low-temperature fixability, hot-offset resistance, and storage stability. Thus, electrophotographic toner binders are required to be capable of appropriately changing its storage modulus around a fixing temperature so that the storage modulus is high at a temperature lower than the fixing temperature and the storage modulus is low at a temperature lower than the fixing temperature.

In order to achieve such appropriate changes in the storage modulus, the conventional electrophotographic toner binders mainly contain a polyester (for example, see Patent Literatures 1 and 2).

Yet, toner binders mainly containing a polyester and toner compositions containing such toner binders have poor charging characteristics due to a decrease in the volume resistivity resulting from moisture absorption, as compared to a polymer derived from a monomer having an ethylenically unsaturated bond. In addition, production of chemical toner containing a toner binder mainly containing a polyester is costly because it requires a special particle-forming technique such as a dissolution suspension method (for example, see Patent Literature 3) or an emulsion aggregation method (for example, see Patent Literature 4), other than the methods such as emulsion polymerization and suspension polymerization, in order to promote dehydration condensation.

In contrast, the conventional electrophotographic toner binders mainly containing, instead of a polyester, a polymer derived from a monomer having an ethylenically unsaturated bond have a low intermolecular cohesive force as compared to a toner binder mainly containing a polyester, thus failing to simultaneously provide low-temperature fixability and hot-offset resistance.

In order to solve the problems, a technique to provide a binder toner containing a low molecular weight component and a high molecular weight component which are separately polymerized (for example, see Patent Literature 5) and a technique to use a moiety having a high cohesive force as a structural unit (for example, see Patent Literature 6) have been suggested. Yet, in each case, the loss modulus at a low temperature increases along with an increase in the storage modulus at a high temperature, with the result that low-temperature fixability is insufficient.

Thus, techniques to improve the low-temperature fixability with the use of crystalline acrylate resin have been suggested (for example, Patent Literatures 7 to 11).

In Patent Literature 7, the acid value of chemical toner is added to toner for its easy granulation and charging environmental stability of the toner as chemical toner. Yet, crystalline acrylate resin provided with an acid value results in a lower melting point because the crystallinity is inhibited, which results in poor storage stability.

Patent Literature 8 suggests a toner containing a crystalline acrylate resin homopolymer or a copolymer of a crystalline acrylate resin and styrene. With use of a crystalline acrylate resin homopolymer, it is possible to provide a toner having storage stability owing to a high melting point and low-temperature fixability owing to sharp melting properties. However, the resulting toner has insufficient elasticity at a high temperature, so that the toner may have insufficient hot-offset resistance when used in a fixing device with a high nip pressure such as a monochrome high-speed machine.

Patent Literatures 9 and 10 aim to solve the insufficient hot-offset resistance by a combination of crystalline acrylate resin and a crosslinking agent. Yet, the resulting toner binder is applicable only to a pulverized toner due to generation of insoluble components, and is thus not applicable to a chemical toner. The resulting toner also shows an increase in the low viscosity due to crosslinking. Thus, the toner fails to satisfy the low-temperature fixability, which has been increasingly required nowadays.

In Patent Literature 11, crystalline acrylate resin is used to reduce uneven texture resulting from wax contained in a clear toner. Yet, the clear toner fails to simultaneously provide low-temperature fixability and hot-offset resistance which are required for common toner binders.

CITATION LIST

Patent Literature

Patent Literature 1: JP 4493080 B
Patent Literature 2: JP 2105762 B
Patent Literature 3: JP 3596104 B
Patent Literature 4: JP 3492748 B
Patent Literature 5: JP H11-327210 A
Patent Literature 6: JP 3212860 B
Patent Literature 7: JP 4677909 B
Patent Literature 8: JP H11-44967 A
Patent Literature 9: JP 3458165 B
Patent Literature 10: JP 2000-352839 A
Patent Literature 11: JP 2011-095727 A

SUMMARY OF INVENTION

Technical Problem

The present invention aims to provide an electrophotographic toner binder containing, as a main component, a polymer whose constituent monomer is a monomer having an ethylenically unsaturated bond, the electrophotographic toner binder being excellent in low-temperature fixability, hot-offset resistance, and storage stability.

Solution to Problem

As a result of extensive studies to solve the above problems, the present inventors arrived at the present invention.

Specifically, the present invention provides an electrophotographic toner binder containing a polymer (A) containing a monomer (a) and a monomer (x) different from the monomer (a) as essential constituent monomers, wherein the monomer (a) is a (meth)acrylate having a C18-C36 acyclic hydrocarbon group, the polymer (A) has an acid value of 40 or less, and the polymer (A) satisfies the following relational expression (1); and an electrophotographic toner composition containing the electrophotographic toner binder:

$$1.1\ (cal/cm^3)^{0.5} \leq |SP(x) - SP(a)| \leq 8.0\ (cal/cm^3)^{0.5} \quad \text{relational expression (1):}$$

wherein SP(a) is the solubility parameter (SP value) of a structural unit derived from the monomer (a) constituting the polymer (A); and SP(x) is the SP value of a structural unit derived from the monomer (x) different from the monomer (a) constituting the polymer (A).

Advantageous Effects of Invention

The toner composition containing the toner binder of the present invention is excellent in low-temperature fixability, hot-offset resistance, and storage stability.

The toner binder of the present invention contains a polymer derived from a monomer having an ethylenically unsaturated bond and can be produced without polycondensation reaction. Thus, the toner binder is also applicable to production of chemical toner by a known method such as emulsion polymerization or suspension polymerization.

DESCRIPTION OF EMBODIMENTS

The electrophotographic toner binder of the present invention is an electrophotographic toner binder containing a polymer (A).

The polymer (A) is a polymer containing a monomer (a) and a monomer (x) different from the monomer (a) as essential constituent monomers, wherein the monomer (a) is a (meth)acrylate having a C18-C36 acyclic hydrocarbon group, the polymer (A) has an acid value of 40 or less, and the polymer (A) satisfies the relational expression (1).

The monomer (a) is a (meth)acrylate having a C18-C36 acyclic hydrocarbon group.

Examples of the (meth)acrylate having a C18-C36 acyclic hydrocarbon group include (meth)acrylates having a C18-C36 linear alkyl group (e.g., octadecyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, montanyl (meth)acrylate, myricyl (meth)acrylate, and dotriacontyl (meth)acrylate) and (meth)acrylates having a C18-C36 branched alkyl group (e.g., 2-decyltetradecyl (meth)acrylate).

Among these, in view of storage stability of the resulting toner, the monomer (a) is preferably a (meth)acrylate having a C18-C36 linear alkyl group, more preferably a (meth) acrylate having a C18-C34 linear alkyl group, particularly preferably a (meth)acrylate having a C18-C30 linear alkyl group, most preferably linear octadecyl (meth)acrylate and linear behenyl (meth)acrylate.

These monomers (a) may be used alone or in combination of two or more thereof.

The monomer (x) preferably includes: a monomer (b) having at least one functional group selected from the group consisting of a nitrile group, a urethane group, a urea group, an amide group, an imide group, an allophanate group, an isocyanurate group, and a biuret group, and an ethylenically unsaturated bond; and at least one monomer (c) selected from the group consisting of vinylbenzene, methyl methacrylate, and methyl acrylate. The monomer (x) may also include a monomer (d) different from the monomers (a), (b), and (c).

Examples of the monomer (b) include monomers such as a monomer (b1) having a nitrile group, a monomer (b2) having a urethane group, a monomer (b3) having a urea group, a monomer (b4) having an amide group, a monomer (b5) having an imide group, a monomer (b6) having an allophanate group, a monomer (b7) having an isocyanurate group, and a monomer (b8) having a biuret group.

Examples of the monomer (b1) having a nitrile group include acrylonitrile and methacrylonitrile.

Examples of the monomer (b2) having a urethane group include:

monomers obtained by reacting, by a known method, a C2-C22 alcohol having an ethylenically unsaturated bond (e.g., 2-hydroxyethyl methacrylate or vinyl alcohol) with a C1-C30 isocyanate (e.g., a monoisocyanate (e.g., benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, or 2,6-diisopropylphenyl isocyanate), an aliphatic diisocyanate compound (e.g., trimethylene diisocyanate, tetramethylene diisocyanate, hexamethylene diisocyanate, pentamethylene diisocyanate, 1,2-propylenediisocyanate, 1,3-butylene diisocyanate, dodecamethylene diisocyanate, or 2,4,4-trimethylhexamethylene diisocyanate), an alicyclic diisocyanate compound (e.g., 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, or hydrogenated tetramethylxylylene diisocyanate), or an aromatic diisocyanate compound (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenylether diisocyanate, 4,4'-diphenyl diisocyanate, 1,5-naphthalene diisocyanate, or xylylene diisocyanate)); and monomers obtained by reacting, by a known method, a C1-C26 alcohol (e.g., methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, or erucyl alcohol) with a C2-C30 isocyanate having an ethylenically unsaturated bond (e.g., 2-isocyanatoethyl (meth)acrylate, 2-(O-[1'-methylpropylideneamino]carboxyamino) ethyl (meth)acrylate, 2-[(3,5-dimethylpyrazolyl)carbonylamino]ethyl (meth)acrylate, or 1,1-(bis(meth) acryloyloxymethyl)ethyl isocyanate).

Herein, the carbon number of a compound and structure having an isocyanate group does not include the carbon number of the isocyanate (NCO).

Examples of the monomer (b3) having a urea group include:

monomers obtained by reacting, by a known method, a C3-C22 amine (e.g., a primary amine (e.g., normal butylamine, t-butylamine, propylamine, or isopropylamine), a secondary amine (e.g., dinormal ethylamine, dinormal propylamine, or dinormal butylamine), aniline, or cyclohexylamine) and a C2-C30 isocyanate having an ethylenically unsaturated bond.

Examples of the monomer (b4) having an amide group include:

monomers obtained by reacting, by a known method, a C1-C30 amine and a C2-C30 carboxylic acid having an ethylenically unsaturated bond (e.g., acrylic acid or methacrylic acid).

Herein, the carbon number of a compound and structure having a carboxyl group does not include the carbon number of the carboxyl group.

Examples of the monomer (b5) having an imide group include:
monomers obtained by reacting, by a known method, ammonia and a C2-C10 carboxylic anhydride having an ethylenically unsaturated bond (e.g., maleic anhydride or acrylic anhydride), and
monomers obtained by reacting, by a known method, a C1-C30 primary amine and a C2-C10 carboxylic anhydride having an ethylenically unsaturated bond.

Herein, the carbon number of a monomer having a carboxylic anhydride structure does not include the carbon number (2) derived from the carboxyl group moiety.

Examples of the monomer (b6) having an allophanate group include:
monomers obtained by reacting, by a known method, the monomer (b2) having a urethane group and a C1-C30 isocyanate.

Examples of the monomer (b7) having an isocyanurate group include:
tris(2-acryloyloxyethyl) isocyanurate and ε-caprolactone-modified tris-(2-acryloxyethyl) isocyanurate.

Examples of the monomer (b8) having a biuret group include:
monomers obtained by reacting, by a known method, the monomer (b3) having a urea group and a C1-C30 isocyanate.

Each of the reactions to obtain the monomers (b2) to (b8) may be performed by the following procedure.

For example, before the above reaction, one compound having an ethylenically unsaturated bond is polymerized with the monomer (a) so as to synthesize a precursor of the polymer (A), and subsequently, the precursor of the polymer (A) is reacted with a reaction partner so as to form a structural unit derived from one of the monomers (b2) to (b8).

A value (also referred to as a functional group equivalent) obtained by dividing the molecular weight of the monomer (b) by the total number of nitrile, urethane, urea, amide, imide, allophanate, isocyanurate, and biuret groups in one molecule of the monomer (b) is preferably 800 or less. In view of loss modulus of the resulting toner, the functional group equivalent is more preferably 500 or less.

Among these, in view of the balance between storage modulus and loss modulus of the resulting toner, the monomer (b) is preferably the monomer (b1) having a nitrile group, the monomer (b2) having a urethane group, and the monomer (b3) having a urea group, or the monomer (b4) having an amide group, more preferably the monomer (b1) having a nitrile group, the monomer (b3) having a urea group, or the monomer (b4) having an amide group.

These monomers (b) may be used alone or in combination of two or more thereof.

Examples of the monomer (c) include vinylbenzene, methyl methacrylate, and methyl acrylate. Among these, the monomer (c) is preferably vinylbenzene in view of hygroscopicity reduction and chargeability of the resulting toner.

Examples of the monomer (d) different from the monomer (a), monomer (b), and monomer (c) include acrylic acid, methacrylic acid, divinylbenzene, and Eleminol JS-2 (sodium alkylallylsulfosuccinate, Sanyo Chemical Industries, Ltd.).

The weight average molecular weight of the polymer (A) of the present invention is preferably 30,000 or more and 3,000,000 or less, more preferably 88,000 or more and 2,900,000 or less, particularly preferably 101,000 or more and 1,500,000 or less, in view of storage modulus of the resulting toner.

The weight average molecular weight of the polymer (A) of the present invention is measured by gel permeation chromatography (hereinafter abbreviated to "GPC") under the following conditions.
Device (an example): HLC-8120 (Tosoh Corporation)
Column (an example): TSK GEL GMH6, two columns (Tosoh Corporation)
Measurement temperature: 40° C.
Sample solution: 0.25% by weight tetrahydrofuran solution (obtained by filtering off insoluble matter by a PTFE filter with an aperture of 1 μm)
Mobile phase: tetrahydrofuran (not containing a polymerization inhibitor)
Amount of solution injected: 100 μl
Detector: refractive index detector
Standard substance: standard polystyrene available from Tosoh Corporation (TSK standard polystyrene) 12 samples (weight average molecular weight: 500, 1050, 2800, 5970, 9100, 18100, 37900, 96400, 190000, 355000, 1090000, and 2890000)

The polymer (A) of the present invention satisfies the relational expression (1) as described above:

$$1.1\ (cal/cm^3)^{0.5} \leq |SP(x)-SP(a)| \leq 8.0\ (cal/cm^3)^{0.5}. \quad \text{relational expression (1):}$$

In the relational expression (1), SP(a) is the solubility parameter (hereinafter may be abbreviated to SP value) of a structural unit derived from the monomer (a) constituting the polymer (A); and SP(x) is the SP value of a structural unit derived from the monomer different from the monomer (a) constituting the polymer (A). |SP(x)−SP(a)| is an absolute difference between SP(a) and SP(x).

The SP value in the present invention is a value calculated by a method described in Polymer Engineering & Science, Robert F. Fedors et al., vol. 14, pp. 151-154.

When |SP(x)−SP(a)| is less than 1.1 $(cal/cm^3)^{0.5}$, the resin has a lower melting point. When |SP(x)−SP(a))| is more than 8.0 $(cal/cm^3)^{0.5}$, the resin may be less copolymerizable, or the resin becomes non-uniform and is easily gelated. A preferred range of the relational expression (1) is 1.5 $(cal/cm^3)^{0.5} \leq |SP(x)-SP(a)| \leq 6.0\ (cal/cm^3)^{0.5}$.

|SP(x)−SP(a)| can be adjusted by appropriately selecting constituent monomers.

In view of storage stability of the resulting toner, the melting peak temperature Tm (K) of the polymer (A) of the present invention as obtained by DSC measurement of the resin is preferably 313 to 373 K, more preferably 318 to 353 K, particularly preferably 323 to 348 K.

Tm can be adjusted by adjusting values of SP(x) and SP(a) and the carbon number of the monomer (a).

The DSC measurement in the present invention is performed using a differential scanning calorimeter (Seiko Instruments Inc., DSC 210 or the like) under the following conditions.

<Measurement Conditions>
(1) Temperature maintained at 30° C. for 10 minutes
(2) Temperature increased to 150° C. at 10° C./min
(3) Temperature maintained at 150° C. for 10 minutes
(4) Temperature cooled to 0° C. at 10° C./min
(5) Temperature maintained at 0° C. for 10 minutes
(6) Temperature increased to 150° C. at 10° C./min
Each endothermic peak observable in the process of (6) is analyzed.

ΔTp, ΔTj, Ts, and the Tm of the resin of the polymer (A) as obtained by DSC measurement of the resin preferably satisfy all the following relational expressions (3) to (5), in view of storage stability of the resulting toner.

$1 \leq \Delta Tj/\Delta Tp \leq 40$     Relational expression (3):

$Tm/Ts \leq 1.25$     Relational expression (4):

$1.5 \leq \Delta Tp \leq 8.5$     Relational expression (5):

In the relational expression (3), ΔTj is the melting enthalpy (mJ/mg).

The polymer (A) can be adjusted to fall within the range in the relational expression (3) by adding an additive that can be a crystal nucleus, controlling the monomer tacticity or monomer sequence such as alternating copolymerizability by a known method, or adjusting the ratio of the monomer (a). ΔTj/ΔTp is more preferably 1.5 to 34, particularly preferably 2 to 30.

In the relational expression (4), Ts is the softening point (K) defined below.

The polymer (A) can be adjusted to fall within the range in the relational expression (4) by adjusting the composition distribution of the monomer (a) to be used, adding an additive that can be a crystal nucleus, controlling the monomer tacticity or monomer sequence such as alternating copolymerizability by a known method, or adjusting the ratio of the monomer (a). Ts is more preferably 305 to 365 K, particularly preferably 310 to 345 K.

<Softening Point Ts>

A straight line connecting two temperature points on a DSC curve (vertical axis: heat flow; horizontal axis: temperature) obtained by DSC measurement of the polymer (A) during heating is referred to as a straight line (a), the two temperature points being where a value of DDSC (a value obtained by differentiating the heat flow with respect to the temperature) is zero immediately before and after a melting peak on the DSC curve.

A tangent line to the DSC curve at a peak top temperature in a DDSC curve (vertical axis: DDSC; horizontal axis: temperature) on a low temperature side of the melting peak is referred to as a straight line (b).

The temperature (K) at the intersection of the straight line (a) and the straight line (b) is the softening point Ts.

In the relational expression (5), ΔTp is more preferably 1.9 to 8.0, particularly preferably 2.0 to 7.7.

In the relational expression (3) and the relational expression (5), ΔTp (K) is the half-width of the melting peak indicating the melting peak temperature defined below.

The polymer (A) can be adjusted to fall within the range in the relational expression (5) by adjusting the carbon number distribution of the monomer (a) to be used, changing the values of SP(x) and SP(a), or annealing.

<Half-Width of the Melting Peak ΔTp>

In a DSC curve (vertical axis: heat flow; horizontal axis: temperature), a straight line passing through the melting peak top and parallel to the vertical axis is referred to as a "straight line (c)". A perpendicular bisector of a segment connecting the intersection of the straight line (a) and the straight line (c) and the melting peak top is referred to as a straight line (d). The temperature difference (K) between two intersections of the straight line (d) and the DSC curve of the melting peak is referred to as the half-width of the melting peak ΔTp.

The polymer (A) preferably satisfies the following relational expression (2), in view of storage stability and low-temperature fixability of the resulting toner:

$1.6 \leq \ln(G'_{Tm-10})/\ln(G'_{Tm+30}) \leq 2.6$.     relational expression (2):

Values are calculated by rounding two decimal places.

In the relational expression (2), $G'_{Tm-10}$ is the storage modulus (Pa) of the polymer (A) when the temperature of the polymer (A) is (Tm−10) K, and $G'_{Tm+30}$ is the storage modulus (Pa) of the polymer (A) when the temperature of the polymer (A) is (Tm+30) K.

$\ln(G'_{Tm-10})/\ln(G'_{Tm+30})$ is particularly preferably 1.7 to 2.5. $\ln(G'_{Tm-10})/\ln(G'_{Tm+30})$ can be adjusted by adjusting the molecular weight of the polymer (A) or the amount of the monomer (b).

The storage modulus G' of the polymer (A) and the storage modulus G' and the loss modulus G" (described later) of the toner binder of the present invention are values measured using the following viscoelastic meter, under the following conditions.

Device: ARES-24A (Rheometric Scientific Ltd.)
Jig: 25 mm parallel plate
Frequency: 1 Hz
Strain rate: 5%
Heating rate: 5° C./min In view of low-temperature fixability, the amount of the monomer (a) as a constituent monomer constituting the polymer (A) of the present invention is preferably 30 to 99% by weight, more preferably 39 to 98% by weight, based on the weight of the polymer (A).

In view of low-temperature fixability and hot-offset resistance of the toner, the amount of the monomer (b) as a constituent monomer constituting the polymer (A) of the present invention is preferably 1 to 70% by weight, more preferably 2 to 61% by weight, based on the weight of the polymer (A).

In view of low-temperature fixability, the amount of the monomer (c), when used as a constituent monomer constituting the polymer (A) of the present invention, is preferably 0.1 to 69% by weight, more preferably 0.1 to 59% by weight, based on the weight of the polymer (A).

The polymer (A) of the present invention has an acid value of 40 or less. The polymer (A) having an acid value more than 40 may have poor storage stability due to a decrease in the melting peak temperature Tm and an increase in hygroscopicity. The acid value of the polymer (A) is preferably 0 to 20, more preferably 0 to 5.

The acid value of the polymer (A) can be adjusted by adjusting the acid value of the monomer and the amount of the monomer having an acid value. The acid value of the polymer (A) is measured by a method according to JIS K 0070, for example.

The polymer (A) of the present invention can be produced by polymerizing a monomer composition containing the monomer (a), and if necessary, the monomer (b), the monomer (c), and the monomer (d), by a known method (a method described in JP H05-117330 A or the like). For example, the polymer (A) can be synthesized by the solution polymerization method in which the monomer is reacted in the presence of a radical initiator (e.g., azobisisobutyronitrile) in a solvent (e.g., toluene).

When one or more of the monomers (b2) to (b8) are used, as described for the monomer (b), the polymer (A) may be produced by the following procedure. For example, one compound having an ethylenically unsaturated bond before undergoing the reaction to produce one of the monomers (b2) to (b8) is polymerized with the monomer (a) so as to synthesize a precursor of the polymer (A), and subsequently, the precursor of the polymer (A) is reacted with its reaction partner so as to form a structural unit derived from the one of the monomers (b2) to (b8).

The electrophotographic toner binder of the present invention may also contain other polymers different from the polymer (A), which are known as toner binder polymers (e.g., polymers described in JP 4493080 B, JP 2105762 B, and JP H06-194876 A).

The electrophotographic toner binder of the present invention may also contain compounds used during polymerization of the polymer (A) and residues of such compounds, as long as the effects of the present invention are not impaired.

In regard to the viscoelasticity of the electrophotographic toner binder, the loss modulus particularly at 353 K, i.e., low-temperature loss modulus G" (353 K), is preferably 4.0 E+02 Pa to 3.0 E+05 Pa, more preferably 4.0 E+02 Pa to 1.0 E+05 Pa, in view of fixability of the toner.

At 4.0 E+02 Pa or more, the toner has good fixability; while at 3.0 E+05 Pa or less, the toner is sufficiently bonded to the paper when fixed thereto.

In regard to the viscoelasticity of the electrophotographic toner binder, the storage modulus particularly at 380 K, i.e., high-temperature storage modulus G' (380 K), is preferably 6.0 E+02 Pa or more, more preferably 1.0 E+04 Pa or more, in view of hot-offset resistance.

Herein, when a value is expressed with "E+ number", the number indicates the number of zeros and the value is multiplied by 1 followed by the number of zeros. For example, "E+02" means multiplication of 100, and "E+05" means multiplication of 100000.

The loss modulus and storage modulus of the electrophotographic toner binder can be measured by a method similar to the method described for the storage modulus G' of the polymer (A).

The storage modulus and loss modulus of the electrophotographic toner binder can be adjusted to fall within the preferred range by adjusting the molecular weight of the polymer (A) and the compositions of the constituent monomers.

The melting peak temperature Tm of the electrophotographic toner binder is preferably 313 to 373 K.

At 313 K or higher, the resulting toner has sufficient heat-resistance storage stability. At 373 K or lower, the resulting toner has sufficient low-temperature fixability.

The melting peak temperature Tm of the electrophotographic toner binder can be measured by a method similar to the method described for the melting peak temperature Tm of the polymer (A).

The melting peak temperature Tm of the electrophotographic toner binder can be adjusted to fall within the preferred range by adjusting the carbon number of the monomer (a) constituting the polymer (A) and adjusting the weight ratio of the monomer (a) constituting the polymer (A).

The weight ratio of the polymer (A) in the electrophotographic toner binder is preferably 5 to 100% by weight based on the weight of the electrophotographic toner binder, in view of the balance between storage modulus and loss modulus of the resulting toner.

The electrophotographic toner binder of the present invention can be obtained by a production method in which the polymer (A) and other polymers described above are uniformly mixed simply by a known mechanical mixing method (for example, a method that uses a mechanical stirrer or a magnetic stirrer) or a production method in which the polymer (A) and other polymers described above are simultaneously dissolved and homogenized in a solvent, and the solvent is then removed.

In the case of the mechanical mixing method, the temperature during mixing is preferably 50° C. to 200° C.

The mixing time is preferably 0.5 to 24 hours.

In the case of the method of dissolving in a solvent, the solvent is not particularly limited as long as it allows all the polymers constituting the toner binder to be suitably dissolved therein (e.g., toluene or acetone).

The temperature during solvent removal is preferably 50° C. to 200° C. If necessary, solvent removal can be accelerated by decompression or ventilation.

The electrophotographic toner composition of the present invention contains the electrophotographic toner binder of the present invention. The electrophotographic toner composition preferably contains a colorant, and if necessary, further contains a release agent, a charge control agent, a fluidizing agent, and the like.

The colorant can be any dye, pigment, or the like that is used as a toner colorant. Specific examples include carbon black, iron black, Sudan Black SM, Fast Yellow G, Benzidine Yellow, Pigment Yellow, Indofast Orange, Pigment Red, Irgazin Red, para-nitroaniline red, Toluidine Red, Carmine FB, Pigment Orange R, Lake Red 2G, Rhodamine FB, Rhodamine B Lake, Methyl Violet B Lake, Phthalocyanine Blue, Pigment Blue, Brilliant Green, Phthalocyanine Green, Pigment Yellow, Oil Yellow GG, Kayaset YG, Orazole Brown B, and Oil Pink OP. These can be used alone or in combination of two or more thereof. In addition, magnetic powder (e.g., powder of a ferromagnetic metal such as iron, cobalt, or nickel, or a compound such as magnetite, hematite, or ferrite) can be added, if necessary, to also serve as a coloring agent.

The amount of the colorant is preferably 1 to 40 parts, more preferably 3 to 10 parts, relative to 100 parts of the electrophotographic toner binder of the present invention. The amount of the magnetic powder, when used, is preferably 20 to 150 parts by weight, more preferably 40 to 120 parts by weight. The "part(s)" means "part(s) by weight" throughout the description.

The release agent is preferably one having a flow softening point (T½) (described below) of 50° C. to 170° C. Examples include polyolefin wax, natural wax, C30-C50 aliphatic alcohols, C30-050 fatty acids, synthetic ester waxes (e.g., fatty acid esters synthesized from C10-C30 fatty acids and C10-C30 alcohols), and mixtures thereof.

<Flow Softening Point (T½)>

Using a descending type flow tester (for example, Shimadzu Corporation, CFT-500D), 1 g of a measurement sample is pushed through a nozzle having a diameter of 1 mm and a length of 1 mm by application of a load of 1.96 MPa by a plunger while it is heated at a heating rate of 6° C./min, and a graph of the "plunger descending amount (flow value)" and the "temperature" is drawn. The temperature corresponding to ½ of the maximum value of the descending amount of the plunger is read from the graph, and this value (a temperature at which half of the measurement sample has flowed out) is regarded as the flow softening point (T½).

Examples of the polyolefin wax include (co)polymers of olefins (e.g., ethylene, propylene, 1-butene, isobutylene, 1-hexene, 1-dodecene, 1-octadecen, and mixtures thereof) (including those obtained by (co)polymerization and thermally degraded polyolefins), oxides of (co)polymers of olefins by oxygen and/or ozone, (co)polymers of olefins modified by maleic acid (e.g., products modified by maleic acid and its derivatives (e.g., maleic anhydride, monomethyl maleate, monobutyl maleate, and dimethyl maleate)), (co)polymers of olefins and an unsaturated carboxylic acid (e.g., (meth)acrylic acid, itaconic acid, or maleic anhydride) and/ or an unsaturated carboxylic acid alkyl ester (e.g., a (meth) acrylic acid alkyl (C1-C18 alkyl) ester or a maleic acid alkyl (C1-C18 alkyl) ester), and Sasol Wax.

Examples of the natural wax include carnauba wax, montan wax, paraffin wax, and rice wax. Examples of C30-C50 aliphatic alcohols include triacontanol. Examples of C30-C50 fatty acids include triacontan carboxylic acid.

Examples of the charge control agent include nigrosine dyes, triphenylmethane-based dyes containing a tertiary amine as a side chain, quaternary ammonium salts, polyamines, imidazole derivatives, quaternary ammonium salt-containing polymers, metal-containing azo dyes, copper phthalocyanine dyes, metal salts of salicylic acid, boron complexes of benzilic acid, sulfonic acid group-containing polymers, fluorine-containing polymers, and halogen-substituted aromatic ring-containing polymers.

Examples of the fluidizing agent include colloidal silica, alumina powder, titanium dioxide powder, and calcium carbonate powder.

The component ratio of the toner composition of the present invention based on the weight of the toner composition is as follows. The electrophotographic toner binder of the present invention is preferably 30 to 97% by weight, more preferably 40 to 95% by weight, particularly preferably 45 to 92% by weight. The colorant is preferably 0.05 to 60% by weight, more preferably 0.1 to 55% by weight, particularly preferably 0.5 to 50% by weight. Among the additives, the release agent is preferably 0 to 30% by weight, more preferably 0.5 to 20% by weight, particularly preferably 1 to 10% by weight; the charge control agent is preferably 0 to 20% by weight, more preferably 0.1 to 10% by weight, particularly preferably 0.5 to 7.5% by weight; and the fluidizing agent is preferably 0 to 10%, more preferably 0 to 5% by weight, particularly preferably 0.1 to 4% by weight. The total amount of the additives is preferably 3 to 70% by weight, more preferably 4 to 58% by weight, particularly preferably 5 to 50% by weight. A toner having good chargeability can be readily obtained when the component ratio of the toner falls within the above range.

The toner composition of the present invention may be one obtained by any of the conventionally known methods such as kneading-pulverizing, phase-inversion emulsification, emulsion polymerization, suspension polymerization, dissolution suspension, and emulsion aggregation.

For example, the toner can be produced by the kneading-pulverizing method as follows: components of the toner excluding a fluidizing agent are dry-blended, melt-kneaded, coarsely pulverized, and ultimately pulverized into fine particles using a jet mill or the like; and these particles are further classified to obtain fine particles having a volume average particle size (D50) of preferably 5 to 20 μm, followed by mixing with the fluidizing agent. The volume average particle size (D50) is measured using a Coulter counter (e.g., product name: Multisizer III (Beckman Coulter, Inc.)).

In addition, the toner can be produced by the phase-inversion emulsification method as follows: components of the toner excluding a fluidizing agent are dissolved or dispersed in an organic solvent; and the solution or dispersion is formed into an emulsion by, for example, adding water, followed by separation and classification. The volume average particle size of the toner is preferably 3 to 15 μm.

The emulsion polymerization method and the suspension polymerization method may be known methods (methods disclosed in JP S36-10231 B, JP S47-518305 B, JP S51-14895 B, and the like).

The dissolution suspension method and the emulsion aggregation method may be known methods (methods disclosed in JP 3596104 B, JP 3492748 B, and the like).

The toner composition of the present invention is used as a developer for electric latent images by being mixed with, if necessary, carrier particles, such as iron powder, glass beads, nickel powder, ferrite, magnetite, or resin (e.g., acrylic polymer or silicone polymer)-coated ferrite. The weight ratio of the toner composition to the carrier particles is 1/99 to 100/0. Electric latent images can also be formed by friction with a member such as a charging blade instead of the carrier particles.

The toner composition of the present invention is used as a recording material by being fixed to a support (e.g., paper or polyester film) by using a copier, a printer, or the like. The toner composition can be fixed to a support by a known method such as a heat roll fixing method or a flash fixing method.

EXAMPLES

The present invention is described in further detail below with reference to examples, but the present invention is not limited to these examples. Hereafter, "part(s)" indicates "part(s) by weight and "%" indicates" % by weight.

Production Example 1

Toluene (46 parts) was fed into an autoclave. After nitrogen purging, the autoclave was heated to 105° C. in a sealed state under stirring. A mixture solution of behenyl acrylate (NOF Corporation, the same hereinafter) (40 parts), vinylbenzene (Idemitsu Kosan Co., Ltd., the same hereinafter) (30 parts), acrylonitrile (Nacalai Tesque, Inc., the same hereinafter) (30 parts), Karenz MOI (2-isocyanatoethyl methacrylate, Showa Denko K.K., the same hereinafter) (1.9 parts), Perbutyl O (t-butylperoxy-2-ethylhexanoate, NOF Corporation, the same hereinafter) (0.359 parts), and toluene (23 parts) was dropped to the autoclave over two hours for polymerization while the internal temperature of the autoclave was controlled to stay at 105° C. Further, the mixture was kept at the same temperature for four hours to complete polymerization. Then, methanol (0.6 parts) and Neostann U-600 (Nitto Kasei Kogyo K.K., the same hereinafter) (0.5 parts) were added to the mixture for reaction at 90° C. for six hours, followed by desolvation at 100° C. Thus, a polymer (A1) was obtained.

Production Examples 2 to 6, 10, 11, 16, and 17

Polymers (A2) to (A6), (A10), (A11), (A16), and (A17) were obtained as in Production Example 1, except that the feeding amounts (parts) of behenyl acrylate, vinylbenzene, acrylonitrile, Karenz MOI, Perbutyl O, toluene, and methanol were changed as shown in Table 1.

Production Example 7

A polymer (A7) was obtained as in Production Example 1, except that the feeding amounts (parts) of behenyl acrylate, vinylbenzene, acrylonitrile, Karenz MOI, Perbutyl 0, and toluene were changed as shown in Table 1, and behenyl alcohol (Kalcol 220-80, Kao Corporation, the same hereinafter) (14.3 parts) was used instead of methanol.

Production Example 8

A polymer (A8) was obtained as in Production Example 1, except that the feeding amounts (parts) of behenyl acrylate, vinylbenzene, acrylonitrile, Perbutyl O, and toluene were changed as shown in Table 1, hydroxyethyl methacrylate (HEMA) (Nippon Shokubai Co., Ltd.) (1.6 parts) was used instead of Karenz MOI, and octadecyl monoisocyanate (Hodogaya Chemical Co., Ltd.) (3.6 parts) was used instead of methanol.

Production Example 9

A polymer (A9) was obtained as in Production Example 1, except that the feeding amounts (parts) of behenyl acrylate, acrylonitrile, Karenz MOI, Perbutyl O, toluene, and methanol were changed as shown in Table 1 and methyl methacrylate (Tokyo Chemical Industry Co., Ltd.) (20 parts) was used instead of vinylbenzene.

Production Example 12

A polymer (A12) was obtained as in Production Example 1, except that the feeding amounts (parts) of behenyl acrylate, vinylbenzene, acrylonitrile, Karenz MOI, Perbutyl O, and toluene were changed as shown in Table 1, and dibutylamine (Tokyo Chemical Industry Co., Ltd., the same hereinafter) (1.6 parts) was used instead of methanol.

Production Example 13

After purging the autoclave with nitrogen, behenyl acrylate (70 parts), divinylbenzene (0.06 parts), acrylonitrile (30 parts), and 1,1-di-t-butylperoxy-3,3,5-trimethylcyclohexane (0.060 parts) were fed to the autoclave for polymerization over two hours in a sealed state under stirring while the temperature was controlled to stay at 95° C. with the pressure adjusted and with caution to avoid overheating. Subsequently, the reaction product was heated to 150° C. while toluene (50 parts) and 1,1-di-t-butylperoxy-3,3,5-trimethylcyclohexane (0.060 parts) were dropped thereto over four hours for reaction at 150° C. for one hour, followed by desolvation at 100° C. Thus, a polymer (A13) was obtained.

Production Example 14

A polymer (A14) was obtained as in Production Example 1, except that the feeding amounts (parts) of behenyl acrylate, vinylbenzene, acrylonitrile, Karenz MOI, Perbutyl O, and toluene were changed as shown in Table 1, and dibutylamine (1.7 parts) was used instead of methanol.

Production Example 15

Toluene (46 parts) was fed into an autoclave. After nitrogen purging, the autoclave was heated to 105° C. in a sealed state under stirring. A mixed solution of behenyl acrylate (35 parts), octadecyl acrylate (NOF Corporation, the same hereinafter) (15 parts), vinylbenzene (25 parts), acrylonitrile (25 parts), Karenz MOI (1.9 parts), Perbutyl O (0.359 parts), and toluene (23 parts) was dropped to the autoclave over two hours for polymerization while the internal temperature of the autoclave was controlled to stay at 105° C. Further, the mixture was kept at the same temperature for four hours to complete polymerization. Then, methanol (0.6 parts) and Neostann U-600 (0.5 parts) were added to the mixture for reaction at 90° C. for six hours, followed by desolvation at 100° C. Thus, a polymer (A15) was obtained.

Production Example 18

Toluene (47 parts) was fed into an autoclave. After nitrogen purging, the autoclave was heated to 105° C. in a sealed state under stirring. A mixed solution of behenyl acrylate (50 parts), vinylbenzene (25 parts), acrylonitrile (25 parts), methacrylic acid (Tokyo Chemical Industry Co., Ltd., the same hereinafter) (2 parts), Eleminol JS-2 (sodium alkylallylsulfosuccinate, Sanyo Chemical Industries, Ltd., the same hereinafter) (0.5 parts), Karenz MOI (1.9 parts), Perbutyl O (0.371 parts), and toluene (24 parts) was dropped to the autoclave over two hours for polymerization while the internal temperature of the autoclave was controlled to stay at 105° C. Further, the mixture was kept at the same temperature for four hours to complete polymerization. Then, dibutylamine (1.6 parts) and Neostann U-600 (0.5 parts) were added to the mixture for reaction at 90° C. for six hours, followed by desolvation at 100° C. Thus, a polymer (A18) was obtained.

Production Example 19

A polymer (A19) was obtained as in Production Example 11, except that myricyl acrylate was used instead of behenyl acrylate.

Production Example 20

A polymer (A20) was obtained as in Production Example 11, except that octacosyl acrylate was used instead of behenyl acrylate.

Production Example 21

A polymer (A21) was obtained as in Production Example 1, except that the feeding amounts (parts) of behenyl acrylate, acrylonitrile, Karenz MOI, Perbutyl O, toluene, and methanol were changed as shown in Table 2, and methyl methacrylate (Tokyo Chemical Industry Co., Ltd., the same hereinafter) (48 parts) was used instead of vinylbenzene.

Production Example 22

Toluene (44 parts) was fed into an autoclave. After nitrogen purging, a mixed solution of behenyl acrylate (50 parts), vinylbenzene (14 parts), acrylamide (36 parts), Karenz MOI (1.9 parts), methanol (0.6 parts), Perbutyl O (0.350 parts), and toluene (22 parts) was dropped to the autoclave over two hours for polymerization while the internal temperature of the autoclave was controlled to stay at 105° C. Further, the mixture was kept at the same temperature for four hours to complete polymerization, followed by desolvation at 100° C. Thus, a polymer (A22) was obtained.

Production Example 23

A polymer (A23) was obtained as in Production Example 12, except that the feeding amounts (parts) of behenyl acrylate, vinylbenzene, acrylonitrile, Karenz MOI, dibutylamine, Perbutyl O, and toluene were changed as shown in Table 2, and acrylic acid (3 parts) and methacrylic acid (Tokyo Chemical Industry Co., Ltd.) (2 parts) were used.

Production Example 24

Toluene (45 parts) was fed into an autoclave. After nitrogen purging, a mixed solution of behenyl acrylate (50 parts), vinylbenzene (25 parts), acrylonitrile (25 parts), BANI-M (Maruzen Petrochemical Co., Ltd., the same hereinafter) (0.9 parts), Perbutyl O (0.353 parts), and toluene (22 parts) was dropped to the autoclave over two hours for polymerization while the internal temperature of the autoclave was controlled to stay at 105° C. Further, the mixture was kept at the same temperature for four hours to complete polymerization, followed by desolvation at 100° C. Thus, a polymer (A24) was obtained.

Production Example 25

A polymer (A25) was obtained as in Production Example 24, except that Desmolux XP 2740 (Daicel-Allnex Ltd.) was used instead of BANI-M.

Production Example 26

A polymer (A26) was obtained as in Production Example 24, except that TAIL (Nihon Kasei Co., Ltd.) was used instead of BANI-M.

Production Example 27

A polymer (A27) was obtained as in Production Example 11, except that methyl acrylate (Tokyo Chemical Industry Co., Ltd.) was used instead of vinylbenzene.

Production Example 28

A polymer (A28) was obtained as in Production Example 11, except that the amount of Perbutyl O was changed to 0.880 parts.

Production Example 29

A four-neck reaction vessel was charged with ion-exchanged water (470 parts), a 3% by weight aqueous solution of polyvinyl alcohol (Kuraray Co., Ltd., PVA235) (50 parts), and bicarbonate soda (NaHCO$_3$) (1.4 parts). To the mixture was added a mixture of behenyl acrylate (50 parts), vinylbenzene (35 parts), acrylonitrile (15 parts), Karenz MOI (1.9 parts), dibutylamine (1.6 parts), and Percadox 12-XL25 (Kayaku Akzo Corporation, the same hereinafter) (0.0032 parts), followed by stirring. Thus, a suspension was obtained. Then, the reaction vessel was fully purged with nitrogen, and subsequently heated to 80° C. to initiate polymerization. The polymerization was continued at the same temperature for 10 hours. Further, the temperature was increased to 95° C., and maintained at that temperature for two hours to complete polymerization. The resulting polymer slurry was filtered, fully washed with water repeatedly, and dried using a hot air circulating dryer at 45° C. for 24 hours. Thus, a polymer (A29) was obtained.

Production Example 30

A polymer (A30) was obtained as in Production Example 29, except that the feeding amounts (parts) of vinylbenzene, acrylonitrile, and Percadox 12-XL25 were changed to 25 parts, 25 parts, and 0.013 parts, respectively.

Production Example 31

A polymer (A31) was obtained as in Production Example 11, except that behenyl methacrylate (50 parts) was used instead of behenyl acrylate and the feeding amounts (parts) of vinylbenzene, acrylonitrile, Karenz MOI, Perbutyl O, toluene, and methanol were changed as shown in Table 2.

Production Example 32

A polymer (A32) was obtained as in Production Example 11, except that Karenz MOI and methanol were not used.

Comparative Production Example 1

Toluene (44 parts) was fed into an autoclave. After nitrogen purging, the autoclave was heated to 105° C. in a sealed state under stirring. A mixed solution of behenyl acrylate (100 parts), Perbutyl O (0.350 parts), and toluene (22 parts) was dropped to the autoclave over two hours for polymerization while the internal temperature of the autoclave was controlled to stay at 105° C. Further, the mixture was kept at the same temperature for four hours to complete polymerization, followed by desolvation at 100° C. Thus, a polymer (A'1) was obtained.

Comparative Production Example 2

A polymer (A'2) was obtained as in Production Example 1, except that methyl methacrylate (50 parts) was used instead of vinylbenzene, and the feeding amounts (parts) of behenyl acrylate, acrylonitrile, Karenz MOI, Perbutyl O, toluene, and methanol were changed as shown in Table 3.

Comparative Production Example 3

Toluene (46 parts) was fed into an autoclave. After nitrogen purging, the autoclave was heated to 105° C. in a sealed state under stirring. A mixed solution of hexadecyl acrylate (Tokyo Chemical Industry Co., Ltd.) (50 parts), vinylbenzene (25 parts), acrylonitrile (25 parts), Karenz MOI (1.9 parts), Perbutyl O (0.359 parts), and toluene (23 parts) was dropped to the autoclave over two hours for polymerization while the internal temperature of the autoclave was controlled to stay at 105° C. Further, the mixture was kept at the same temperature for four hours to complete polymerization. Then, methanol (0.6 parts) and Neostann U-600 (0.5 parts) were added to the mixture for reaction at 90° C. for six hours, followed by desolvation at 100° C. Thus, a polymer (A'3) was obtained.

Comparative Production Example 4

Toluene (46 parts) was fed into an autoclave. After nitrogen purging, the autoclave was heated to 105° C. in a sealed state under stirring. A mixed solution of vinylbenzene (50 parts), acrylonitrile (30 parts), methyl methacrylate (18 parts), methacrylic acid (2 parts), Perbutyl O (0.359 parts), and toluene (23 parts) was dropped to the autoclave over two hours for polymerization while the internal temperature of the autoclave was controlled to stay at 105° C. Further, the mixture was kept at the same temperature for four hours to complete polymerization, followed by desolvation at 100° C. Thus, a polymer (A'4) was obtained.

Comparative Production Example 5

Toluene (45 parts) was fed into an autoclave. After nitrogen purging, the autoclave was heated to 105° C. in a sealed state under stirring. A mixed solution of behenyl acrylate (50 parts), vinylbenzene (10 parts), acrylamide (40 parts), Perbutyl O (0.350 parts), and toluene (22 parts) was dropped to the autoclave over two hours for polymerization while the internal temperature of the autoclave was controlled to stay at 105° C. Further, the mixture was kept at the same temperature for four hours to complete polymerization, followed by desolvation at 100° C. Thus, a gel-like polymer (A'5) was obtained.

Comparative Production Example 6

Toluene (44 parts) was fed into an autoclave. After nitrogen purging, the autoclave was heated to 105° C. in a sealed state under stirring. A mixed solution of behenyl acrylate (50 parts), vinylbenzene (21 parts), acrylonitrile (21 parts), methacrylic acid (6.5 parts), Karenz MOI (1.9 parts), Perbutyl O (0.353 parts), and toluene (22 parts) was dropped to the autoclave over two hours for polymerization while the internal temperature of the autoclave was controlled to stay at 105° C. Further, the mixture was kept at the same temperature for four hours to complete polymerization. Then, methanol (0.6 parts) and Neostann U-600 (0.5 parts) were added to the mixture for reaction at 90° C. for six hours, followed by desolvation at 100° C. Thus, a gel-like polymer (A'6) was obtained.

Comparative Production Example 7

To a reaction tank equipped with a condenser, a stirrer, and a nitrogen inlet pipe were added bisphenol A propylene oxide (2 mol) adduct (600 parts), bisphenol A ethylene oxide (2 mol) adduct (100 parts), terephthalic acid (220 parts), and dibutyltin oxide (3 parts), followed by dehydration esterification at 230° C. under a nitrogen stream. Decompression was performed when no more distillate was obtained, and the esterification was performed until the acid value was 1.0. Subsequently, the temperature was set to 220° C., and trimellitic anhydride (20 parts) was added. The mixture was maintained in this state for one hour, and then reacted under an appropriately reduced pressure of 5 to 20 mmHg. The reaction product was taken out from the reaction tank when the flow softening point was 130° C. Then, the reaction product was quickly quenched with a steel belt cooler, and taken out. Thus, a polymer (A'7) was obtained.

Comparative Production Example 8

To a reaction tank equipped with a condenser, a stirrer, and a nitrogen inlet pipe were added bisphenol A propylene oxide (2 mol) adduct (466 parts), bisphenol A ethylene oxide (2 mol) adduct (341 parts), terephthalic acid (247 parts), and tetrabutyl titanate (3 parts) for reaction at 230° C. for five hours under a nitrogen stream while generated water was distilled off. Then, the reaction product was further reacted under a reduced pressure of 5 to 20 mmHg. The reaction product was cooled to 180° C. when the acid value was 2, and trimellitic anhydride (74 parts) was added for further reaction in a sealed state for two hours under normal pressure. After that, the reaction production was taken out, and cooled to room temperature. Thus, a polymer (A'8) was obtained.

Comparative Production Example 9

A polymer (A'9) was obtained as in Comparative Production Example 4, except that acrylonitrile was not used and the parts of the other components were changed as shown in Table 3.

The polymers (A1) to (A32) obtained in Production Examples 1 to 32, respectively, and the comparative polymers (A'1) to (A'9) obtained in Comparative Production Examples 1 to 9, respectively, were evaluated by the following methods for the weight average molecular weight, melting peak temperature Tm (K), softening point Ts (K), melting enthalpy ΔTj (mJ/mg), half-width of the melting peak ΔTp, $G'_{Tm-10}$ (Pa), and $G'_{Tm+30}$ (Pa). Tables 1 to 3 show the results.

TABLE 1

| | | Production Example 1 | Production Example 2 | Production Example 3 | Production Example 4 | Production Example 5 | Production Example 6 |
|---|---|---|---|---|---|---|---|
| | Polymer | A1 | A2 | A3 | A4 | A5 | A6 |
| Monomer (a) | Octadecyl acrylate (C18) | — | — | — | — | — | — |
| | Behenyl acrylate (C22) | 40 | 70 | 50 | 50 | 50 | 50 |
| | Behenyl methacrylate (C22) | — | — | — | — | — | — |
| | Myricyl acrylate (C30) | — | — | — | — | — | — |
| | Octacosyl acrylate (C28) | — | — | — | — | — | — |
| Monomer (b) | Acrylonitrile | 30 | 15 | 5 | 45 | 25 | 25 |
| | Acrylamide | — | — | — | — | — | — |
| | BANI-M | — | — | — | — | — | — |
| | Desmolux XP 2740 | — | — | — | — | — | — |
| | TAIC | — | — | — | — | — | — |
| | Reaction product of MOI and methanol (functional group equivalent: 201) / Karenz MOI | 1.9 | 1.9 | 1.9 | 1.9 | 0.2 | 6.8 |
| | Methanol | 0.6 | 0.6 | 0.6 | 0.6 | 0.1 | 2.0 |
| | Reaction product of MOI and behenyl alcohol (functional group equivalent: 481) / Karenz MOI | — | — | — | — | — | — |
| | Behenyl alcohol | — | — | — | — | — | — |
| | Reaction product of HEMA and octadecyl monoisocyanate (functional group equivalent: 426) / Hydroxyethyl methacrylate | — | — | — | — | — | — |
| | Octadecyl monoisocyanate | — | — | — | — | — | — |
| | Reaction product of MOI and dibutylamine (functional group equivalent: 284) / Karenz MOI | — | — | — | — | — | — |
| | Dibutylamine | — | — | — | — | — | — |
| Monomer (c) | Vinylbenzene | 30 | 15 | 45 | 5 | 25 | 25 |
| | Methyl acrylate | — | — | — | — | — | — |
| | Methyl methacrylate | — | — | — | — | — | — |

TABLE 1-continued

|  |  | | | | | | |
|---|---|---|---|---|---|---|---|
| Other monomer (d) | Methacrylic acid | — | — | — | — | — | — |
|  | Acrylic acid | — | — | — | — | — | — |
|  | Divinylbenzene | — | — | — | — | — | — |
|  | Hexadecyl acrylate (C16) | — | — | — | — | — | — |
| Others | Eleminol JS-2 | — | — | — | — | — | — |
|  | Bisphenol A propylene oxide (2 mol) adduct | — | — | — | — | — | — |
|  | Bisphenol A ethylene oxide (2 mol) adduct | — | — | — | — | — | — |
|  | Terephthalic acid | — | — | — | — | — | — |
|  | Dibutyltin oxide | — | — | — | — | — | — |
|  | Tetrabutyl titanate | — | — | — | — | — | — |
|  | Trimellitic anhydride | — | — | — | — | — | — |
|  | Perbutyl O | 0.359 | 0.359 | 0.359 | 0.359 | 0.351 | 0.381 |
|  | Percadox 12-XL25 | — | — | — | — | — | — |
| 1,1-di-t-Butylperoxy-3,3,5-trimethylcyclohexane | First time | — | — | — | — | — | — |
|  | Second time | — | — | — | — | — | — |
|  | Toluene (initial feeding) | 46 | 46 | 46 | 46 | 45 | 48 |
|  | Toluene (monomer diluent) | 23 | 23 | 23 | 23 | 22 | 24 |
| Physical properties | Weight ratio of structural unit derived from monomer (a) based on the weight of polymer (A) | 39% | 68% | 49% | 49% | 50% | 46% |
|  | $|SP(x) - SP(a)|(cal/cm^3)^{0.5}$ | 3.6 | 3.6 | 20 | 5.1 | 3.6 | 3.6 |
| Analysis value | Weight average molecular weight | 109,000 | 123,000 | 98,000 | 89,000 | 119,000 | 134,000 |
|  | Melting peak temperature Tm (K) | 321 | 323 | 318 | 324 | 319 | 331 |
|  | Softening point Ts (K) | 317 | 319 | 314 | 320 | 315 | 323 |
|  | Melting enthalpy ⊿Tj (mJ/mg) | 18 | 78 | 34 | 36 | 35 | 24 |
|  | Half-width of the melting peak ⊿Tp (K) | 3.4 | 3.7 | 3.6 | 3.3 | 2.2 | 8.2 |
|  | Acid value | 0 | 0 | 0 | 0 | 0 | 0 |
|  | ⊿Tj/⊿Tp | 5.3 | 21.1 | 9.4 | 10.9 | 15.9 | 2.9 |
|  | Tm/Ts | 1.09 | 1.09 | 1.10 | 1.09 | 1.10 | 1.16 |
|  | G'Tm − 10 (Pa) | 2.50E+08 | 1.60E+07 | 1.60E+07 | 2.50E+08 | 1.80E+08 | 1.20E+08 |
|  | G'Tm + 30 (Pa) | 7.20E+03 | 2.20E+03 | 2.10E+03 | 7.60E+03 | 2.20E+03 | 8.20E+04 |
|  | ln(G'Tm − 10)/ln(G'Tm + 30) | 2.2 | 2.2 | 2.2 | 2.2 | 2.5 | 1.6 |

|  |  | Production Example 7 | Production Example 8 | Production Example 9 | Production Example 10 | Production Example 11 | Production Example 12 |
|---|---|---|---|---|---|---|---|
|  | Polymer | A7 | A8 | A9 | A10 | A11 | A12 |
| Monomer (a) | Octadecyl acrylate (C18) | — | — | — | — | — | — |
|  | Behenyl acrylate (C22) | 50 | 50 | 50 | 50 | 50 | 50 |
|  | Behenyl methacrylate (C22) | — | — | — | — | — | — |
|  | Myricyl acrylate (C30) | — | — | — | — | — | — |
|  | Octacosyl acrylate (C28) | — | — | — | — | — | — |
| Monomer (b) | Acrylonitrile | 25 | 25 | 30 | 25 | 25 | 25 |
|  | Acrylamide | — | — | — | — | — | — |
|  | BANI-M | — | — | — | — | — | — |
|  | Desmolux XP 2740 | — | — | — | — | — | — |
|  | TAIC | — | — | — | — | — | — |
| Reaction product of MOI and methanol (functional group equivalent: 201) | Karenz MOI | — | — | 1.9 | 1.9 | 1.9 | — |
|  | Methanol | — | — | 0.6 | 0.6 | 0.6 | — |
| Reaction product of MOI and behenyl alcohol (functional group equivalent: 481) | Karenz MOI | 6.8 | — | — | — | — | — |
|  | Behenyl alcohol | 14.3 | — | — | — | — | — |
| Reaction product of HEMA and octadecyl monoisocyanate (functional group equivalent: 426) | Hydroxyethyl methacrylate | — | 1.6 | — | — | — | — |
|  | Octadecyl monoisocyanate | — | 3.6 | — | — | — | — |
| Reaction product of MOI and dibutylamine (functional group equivalent: 284) | Karenz MOI | — | — | — | — | — | 1.9 |
|  | Dibutylamine | — | — | — | — | — | 1.6 |
| Monomer (c) | Vinylbenzene | 25 | 25 | — | 25 | 25 | 25 |
|  | Methyl acrylate | — | — | — | — | — | — |
|  | Methyl methacrylate | — | — | 20 | — | — | — |
| Other monomer (d) | Methacrylic acid | — | — | — | — | — | — |
|  | Acrylic acid | — | — | — | — | — | — |
|  | Divinylbenzene | — | — | — | — | — | — |
|  | Hexadecyl acrylate (C16) | — | — | — | — | — | — |
| Others | Eleminol JS-2 | — | — | — | — | — | — |
|  | Bisphenol A propylene oxide (2 mol) adduct | — | — | — | — | — | — |
|  | Bisphenol A ethylene oxide (2 mol) adduct | — | — | — | — | — | — |
|  | Terephthalic acid | — | — | — | — | — | — |
|  | Dibutyltin oxide | — | — | — | — | — | — |
|  | Tetrabutyl titanate | — | — | — | — | — | — |
|  | Trimellitic anhydride | — | — | — | — | — | — |
|  | Perbutyl O | 0.424 | 0.368 | 0.359 | 1.144 | 0.359 | 0.362 |
|  | Percadox 12-XL25 | — | — | — | — | — | — |
| 1,1-di-t-Butylperoxy-3,3,5-trimethylcyclohexane | First time | — | — | — | — | — | — |
|  | Second time | — | — | — | — | — | — |
|  | Toluene (initial feeding) | 54 | 47 | 46 | 46 | 46 | 46 |
|  | Toluene (monomer diluent) | 27 | 23 | 23 | 23 | 23 | 23 |

TABLE 1-continued

| | | | | | | | |
|---|---|---|---|---|---|---|---|
| Physical properties | Weight ratio of structural unit derived from monomer (a) based on the weight of polymer (A) | 41% | 48% | 49% | 49% | 49% | 48% |
| | $|SP(x) - SP(a)|(cal/cm^3)^{0.5}$ | 3.6 | 3.6 | 3.7 | 3.6 | 3.6 | 3.5 |
| Analysis value | Weight average molecular weight | 92,000 | 95,000 | 116,000 | 41,000 | 123,000 | 96,000 |
| | Melting peak temperature Tm (K) | 328 | 321 | 322 | 320 | 323 | 325 |
| | Softening point Ts (K) | 324 | 316 | 317 | 315 | 318 | 316 |
| | Melting enthalpy ⊿Tj (mJ/mg) | 38 | 28 | 33 | 33 | 31 | 28 |
| | Half-width of the melting peak ⊿Tp (K) | 3.5 | 5.3 | 4.1 | 3.8 | 4.3 | 6.3 |
| | Acid value | 0 | 0 | 0 | 0 | 0 | 0 |
| | ⊿Tj/⊿Tp | 10.9 | 5.3 | 8.0 | 8.7 | 7.2 | 4.4 |
| | Tm/Ts | 1.08 | 1.12 | 1.11 | 1.12 | 1.11 | 1.16 |
| | G'Tm − 10 (Pa) | 1.80E+08 | 1.50E+08 | 9.60E+07 | 1.10E+08 | 1.90E+08 | 1.20E+08 |
| | G'Tm + 30 (Pa) | 7.10E+03 | 5.20E+04 | 2.50E+04 | 7.00E+03 | 8.00E+03 | 3.10E+04 |
| | ln(G'Tm − 10)/ln(G'Tm + 30) | 2.1 | 1.7 | 1.8 | 2.1 | 2.1 | 1.8 |

| | | | Production Example 13 | Production Example 14 | Production Example 15 | Production Example 16 | Production Example 17 |
|---|---|---|---|---|---|---|---|
| | | Polymer | A13 | A14 | A15 | A16 | A17 |
| Monomer (a) | | Octadecyl acrylate (C18) | — | — | 15 | — | — |
| | | Behenyl acrylate (C22) | 70 | 98 | 35 | 50 | 50 |
| | | Behenyl methacrylate (C22) | — | — | — | — | — |
| | | Myricyl acrylate (C30) | — | — | — | — | — |
| | | Octacosyl acrylate (C28) | — | — | — | — | — |
| Monomer (b) | | Acrylonitrile | 30 | — | 25 | 25 | 25 |
| | | Acrylamide | — | — | — | — | — |
| | | BANI-M | — | — | — | — | — |
| | | Desmolux XP 2740 | — | — | — | — | — |
| | | TAIC | — | — | — | — | — |
| | Reaction product of MOI and methanol (functional group equivalent: 201) | Karenz MOI | — | — | 1.9 | 1.9 | 1.9 |
| | | Methanol | — | — | 0.6 | 0.6 | 0.6 |
| | Reaction product of MOI and behenyl alcohol (functional group equivalent: 481) | Karenz MOI | — | — | — | — | — |
| | | Behenyl alcohol | — | — | — | — | — |
| | Reaction product of HEMA and octadecyl monoisocyanate (functional group equivalent: 426) | Hydroxyethyl methacrylate | — | — | — | — | — |
| | | Octadecyl monoisocyanate | — | — | — | — | — |
| | Reaction product of MOI and dibutylamine (functional group equivalent: 284) | Karenz MOI | — | 2.0 | — | — | — |
| | | Dibutylamine | — | 1.7 | — | — | — |
| Monomer (c) | | Vinylbenzene | — | — | 25 | 25 | 25 |
| | | Methyl acrylate | — | — | — | — | — |
| | | Methyl methacrylate | — | — | — | — | — |
| Other monomer (d) | | Methacrylic acid | — | — | — | — | — |
| | | Acrylic acid | — | — | — | — | — |
| | | Divinylbenzene | — | 0.06 | — | — | — |
| | | Hexadecyl acrylate (C16) | — | — | — | — | — |
| Others | | Eleminol JS-2 | — | — | — | — | — |
| | | Bisphenol A propylene oxide (2 mol) adduct | — | — | — | — | — |
| | | Bisphenol A ethylene oxide (2 mol) adduct | — | — | — | — | — |
| | | Terephthalic acid | — | — | — | — | — |
| | | Dibutyltin oxide | — | — | — | — | — |
| | | Tetrabutyl titanate | — | — | — | — | — |
| | | Trimellitic anhydride | — | — | — | — | — |
| | | Perbutyl O | — | 0.356 | 0.359 | 1.230 | 2.733 |
| | | Percadox 12-XL25 | — | — | — | — | — |
| | 1,1-di-t-Butylperoxy-3,3,5-trimethylcyclohexane | First time | 0.060 | — | — | — | — |
| | | Second time | 0.060 | — | — | — | — |
| | | Toluene (initial feeding) | — | 45 | 46 | 46 | 159 |
| | | Toluene (monomer diluent) | — | 23 | 23 | 23 | 80 |
| Physical properties | Weight ratio of structural unit derived from monomer (a) based on the weight of polymer (A) | | 70% | 96% | 49% | 49% | 49% |
| | $|SP(x) - SP(a)|(cal/cm^3)^{0.5}$ | | 5.5 | 2.1 | 3.5 | 3.6 | 3.6 |
| Analysis value | Weight average molecular weight | | 536,000 | 120,000 | 118,000 | 28,000 | 11,000 |
| | Melting peak temperature Tm (K) | | 331 | 322 | 318 | 317 | 315 |
| | Softening point Ts (K) | | 330 | 318 | 311 | 313 | 309 |
| | Melting enthalpy ⊿Tj (mJ/mg) | | 42 | 73 | 32 | 33 | 32 |
| | Half-width of the melting peak ⊿Tp (K) | | 1.9 | 2.2 | 7.6 | 3.8 | 3.6 |
| | Acid value | | 0 | 0 | 0 | 0 | 0 |
| | ⊿Tj/⊿Tp | | 22.1 | 33.2 | 4.2 | 8.7 | 8.9 |
| | Tm/Ts | | 1.02 | 1.09 | 1.18 | 1.10 | 1.17 |
| | G'Tm − 10 (Pa) | | 1.60E+07 | 1.50E+07 | 7.60E+07 | 2.30E+08 | 2.80E+08 |
| | G'Tm + 30 (Pa) | | 1.80E+03 | 3.10E+03 | 5.30E+03 | 4.50E+03 | 1.54E+03 |
| | ln(G'Tm − 10)/ln(G'Tm + 30) | | 2.2 | 2.1 | 2.1 | 2.3 | 2.7 |

TABLE 2

|  |  |  | Production Example 18 | Production Example 19 | Production Example 20 | Production Example 21 | Production Example 22 |
|---|---|---|---|---|---|---|---|
|  |  | Polymer | A18 | A19 | A20 | A21 | A22 |
| Monomer (a) |  | Octadecyl acrylate (C18) | — | — | — | — | — |
|  |  | Behenyl acrylate (C22) | 50 | — | — | 50 | 50 |
|  |  | Behenyl methacrylate (C22) | — | — | — | — | — |
|  |  | Myricyl acrylate (C30) | — | 50 | — | — | — |
|  |  | Octacosyl acrylate (C28) | — | — | 50 | — | — |
| Monomer (b) |  | Acrylonitrile | 25 | 25 | 25 | 2 | — |
|  |  | Acrytamide | — | — | — | — | 36 |
|  |  | BANI-M | — | — | — | — | — |
|  |  | Desmolux XP 2740 | — | — | — | — | — |
|  |  | TAIC | — | — | — | — | — |
|  | Reaction product of MOI and methanol (functional group equivalent: 201) | Karenz MOI | — | 1.9 | 1.9 | 1.9 | 1.9 |
|  |  | Methanol | — | 0.6 | 0.6 | 0.6 | 0.6 |
|  | Reaction product of MOI and behenyl alcohol (functional group equivalant: 481) | Karenz MOI | — | — | — | — | — |
|  |  | Behenyl alcohol | — | — | — | — | — |
|  | Reaction product of HEMA and octadecyl monoisocyanate (functional group equivalant: 426) | Hydroxyethyl methacrylate | — | — | — | — | — |
|  |  | Octadecyl monoisocyanate | — | — | — | — | — |
|  | Reaction product of MOI and dibutylamine (functional group equivalent: 284) | Karenz MOI | 1.9 | — | — | — | — |
|  |  | Dibutylamine | 1.6 | — | — | — | — |
| Monomer (c) |  | Vinylbenzene | 25 | 25 | 25 | — | 14 |
|  |  | Methyl acrylate | — | — | — | — | — |
|  |  | Methyl methacrylate | — | — | — | 48 | — |
| Other monomer (d) |  | Methacrylic acid | 2 | — | — | — | — |
|  |  | Acrylic acid | — | — | — | — | — |
|  |  | Divinylbenzene | — | — | — | — | — |
|  |  | Hexadecyl acrylate (C16) | — | — | — | — | — |
|  |  | Eleminol JS-2 | 0.5 | — | — | — | — |
| Others |  | Bisphenol A propylene oxide (2 mol) adduct | — | — | — | — | — |
|  |  | Bisphenol A othylene oxide (2 mol) adduct | — | — | — | — | — |
|  |  | Terephthalic acid | — | — | — | — | — |
|  |  | Dibutyltin oxide | — | — | — | — | — |
|  |  | Tetrabutyl titanate | — | — | — | — | — |
|  |  | Trimellitic anhydride | — | — | — | — | — |
|  |  | Perbutyl O | 0.371 | 0.359 | 0.359 | 0.350 | 0.350 |
|  |  | Percadox 12-XL25 | — | — | — | — | — |
|  | 1,1-di-t-Butylperoxy-3,3,5-trimethylcyclohexane | First time | — | — | — | — | — |
|  |  | Second time | — | — | — | — | — |
|  |  | Toluene (initial fooding) | 47 | 46 | 46 | 44 | 44 |
|  |  | Toluene (monomer diluent) | 24 | 23 | 23 | 22 | 22 |
| Physical properties |  | Weight ratio of structural unit derived from monomer (a) based on the weight of polymer (A) | 47% | 49% | 49% | 49% | 49% |
|  |  | $\|SP(x) - SP(a)\|(cal/cm^3)^{0.5}$ | 3.5 | 3.6 | 3.0 | 1.2 | 7.9 |
| Analysis value |  | Weight average molecular weight | 100,500 | 86,000 | 77,000 | 113,000 | 76,000 |
|  |  | Molting peak temperature Tm (K) | 319 | 346 | 346 | 313 | 334 |
|  |  | Softening point Ta (K) | 313 | 335 | 338 | 306 | 328 |
|  |  | Molting enthalpy ⊿Tj (mJ/mg) | 26 | 45 | 48 | 30 | 38 |
|  |  | Half-width of the melting peak ⊿Tp (K) | 5.2 | 6.2 | 7.3 | 6.3 | 3.1 |
|  |  | Acid value | 10 | 0 | 0 | 0 | 0 |
|  |  | ⊿Tj/⊿Tp | 5.0 | 7.3 | 6.6 | 4.8 | 12.3 |
|  |  | Tm/Ts | 1.15 | 1.18 | 1.12 | 1.21 | 1.11 |
|  |  | G'Tm − 10 (Pa) | 1.10E+08 | 1.40E+08 | 1.10E+08 | 1.20E+07 | 2.10E+08 |
|  |  | G'Tm + 30 (Pa) | 5.30E+03 | 7.00E+03 | 5.50E+03 | 3.10E+03 | 6.60E+04 |
|  |  | ln(G'Tm − 10)/ln(G'Tm + 30) | 2.2 | 2.1 | 2.1 | 2.2 | 1.7 |

|  |  |  | Production Example 23 | Production Example 24 | Production Example 25 | Production Example 26 | Production Example 27 |
|---|---|---|---|---|---|---|---|
|  |  | Polymer | A23 | A24 | A25 | A26 | A27 |
| Monomer (a) |  | Octadecyl acrylate (C18) | — | — | — | — | — |
|  |  | Behenyl acrylate (C22) | 60 | 50 | 50 | 50 | 50 |
|  |  | Behenyl methacrylate (C22) | — | — | — | — | — |
|  |  | Myricyl acrylate (C30) | — | — | — | — | — |
|  |  | Octacosyl acrylate (C28) | — | — | — | — | — |
| Monomer (b) |  | Acrylonitrile | 17.5 | 25 | 25 | 25 | 25 |
|  |  | Acrytamide | — | — | — | — | — |
|  |  | BANI-M | — | 0.9 | — | — | — |
|  |  | Desmolux XP 2740 | — | — | 0.9 | — | — |
|  |  | TAIC | — | — | — | 0.9 | — |

TABLE 2-continued

|  |  |  |  |  |  |  |  |
|---|---|---|---|---|---|---|---|
|  | Reaction product of MOI and methanol (functional group equivalent: 201) | Karenz MOI Methanol | — — | — — | — — | — — | 1.9 0.6 |
|  | Reaction product of MOI and behenyl alcohol (functional group equivalant: 481) | Karenz MOI Behenyl alcohol | — — | — — | — — | — — | — — |
|  | Reaction product of HEMA and octadecyl monoisocyanate (functional group equivalent: 426) | Hydroxyethyl methacrylate Octadecyl monoisocyanate | — — | — — | — — | — — | — — |
|  | Reaction product of MOI and dibutylamine (functional group equivalent: 284) | Karenz MOI Dibutylamine | 1.9 1.6 | — — | — — | — — | — — |
| Monomer (c) | Vinylbenzene Methyl acrylate Methyl methacrylate | | 17.5 — — | 25 — — | 25 — — | 25 — — | — 25 — |
| Other monomer (d) | Methacrylic acid Acrylic acid Divinylbenzene Hexadecyl acrylate (C16) Eleminol JS-2 | | 2 3 — — — | — — — — — | — — — — — | — — — — — | — — — — — |
| Others | Bisphenol A propylene oxide (2 mol) adduct Bisphenol A othylene oxide (2 mol) adduct Terephthalic acid Dibutyltin oxide Tetrabutyl titanate Trimellitic anhydride Perbutyl O Percadox 12-XL25 | | — — — — — — 0.345 — | — — — — — — 0.353 — | — — — — — — 0.353 — | — — — — — — 0.350 — | — — — — — — 0.358 — |
| | 1,1-di-t-Butylperoxy-3,3,5-trimethylcyclohexane | First time Second time | — — | — — | — — | — — | — — |
|  | Toluene (initial fooding) Toluene (monomer diluent) | | 44 22 | 45 22 | 45 22 | 44 22 | 46 23 |
| Physical properties | Weight ratio of structural unit derived from monomer (a) based on the weight of polymer (A) | | 58% | 50% | 50% | 50% | 49% |
|  | $\|SP(x) - SP(a)\|(cal/cm^3)^{0.5}$ | | 3.6 | 3.6 | 3.6 | 3.6 | 4.4 |
| Analysis value | Weight average molecular weight Molting peak temperature Tm (K) Softening point Ta (K) Molting enthalpy ΔTj (mJ/mg) Half-width of the melting peak ΔTp (K) Acid value ΔTj/ΔTp Tm/Ts G'Tm − 10 (Pa) G'Tm + 30 (Pa) ln(G'Tm − 10)/ln(G'Tm + 30) | | 78,000 329 324 28 6.6 0 4.2 1.10 5.10E+08 3.50E+03 2.5 | 123,000 336 331 38 3.1 0 12.3 1.09 1.80E+08 5.20E+04 1.8 | 52,000 334 328 33 4.3 0 7.7 1.11 3.20E+08 1.20E+05 1.7 | 73,000 334 328 38 3.1 0 12.3 1.11 4.30E+08 9.00E+05 1.4 | 98,000 326 321 38 5 0 7.6 1.10 1.10E+08 1.80E+04 1.9 |

|  |  |  | Production Example 28 | Production Example 29 | Production Example 30 | Production Example 31 | Production Example 32 |
|---|---|---|---|---|---|---|---|
|  | Polymer | | A28 | A29 | A30 | A31 | A32 |
| Monomer (a) | Octadecyl acrylate (C18) Behenyl acrylate (C22) Behenyl methacrylate (C22) Myricyl acrylate (C30) Octacosyl acrylate (C28) | | — 50 — — — | — 50 — — — | — 50 — — — | — — 50 — — | — 50 — — — |
| Monomer (b) | Acrylonitrile Acrytamide BANI-M Desmolux XP 2740 TAIC | | 25 — — — — | 15 — — — — | 25 — — — — | 25 — — — — | 25 — — — — |
|  | Reaction product of MOI and methanol (functional group equivalent: 201) | Karenz MOI Methanol | 1.9 0.6 | — — | — — | 1.9 0.6 | — — |
|  | Reaction product of MOI and behenyl alcohol (functional group equivalant: 481) | Karenz MOI Behenyl alcohol | — — | — — | — — | — — | — — |
|  | Reaction product of HEMA and octadecyl monoisocyanate (functional group equivalent: 426) | Hydroxyethyl methacrylate Octadecyl monoisocyanate | — — | — — | — — | — — | — — |
|  | Reaction product of MOI and dibutylamine (functional group equivalent: 284) | Karenz MOI Dibutylamine | — — | 1.9 1.6 | 1.9 1.6 | — — | — — |
| Monomer (c) | Vinylbenzene Methyl acrylate Methyl methacrylate | | 25 — — | 25 — — | 25 — — | 25 — — | 25 — — |
| Other monomer (d) | Methacrylic acid Acrylic acid Divinylbenzene Hexadecyl acrylate (C16) Eleminol JS-2 | | — — — — — | — — — — — | — — — — — | — — — — — | — — — — — |

TABLE 2-continued

| | | | | | | |
|---|---|---|---|---|---|---|
| Others | Bisphenol A propylene oxide (2 mol) adduct | | — | — | — | — | — |
| | Bisphenol A othylene oxide (2 mol) adduct | | — | — | — | — | — |
| | Terephthalic acid | | — | — | — | — | — |
| | Dibutyltin oxide | | — | — | — | — | — |
| | Tetrabutyl titanate | | — | — | — | — | — |
| | Trimellitic anhydride | | — | — | — | — | — |
| | Perbutyl O | | 0.880 | — | — | 0.359 | 0.359 |
| | Percadox 12-XL25 | | — | 0.0032 | 0.013 | — | — |
| | 1,1-di-t-Butylperoxy-3,3,5-trimethylcyclohexane | First time | — | — | — | — | — |
| | | Second time | — | — | — | — | — |
| | Toluene (initial fooding) | | 46 | — | — | 46 | 46 |
| | Toluene (monomer diluent) | | 23 | — | — | 23 | 23 |
| Physical properties | Weight ratio of structural unit derived from monomer (a) based on the weight of polymer (A) | | 49% | 48% | 48% | 49% | 50% |
| | |SP(x) − SP(a)|(cal/cm$^3$)$^{0.5}$ | | 3.5 | 2.8 | 2.8 | 3.5 | 3.6 |
| Analysis value | Weight average molecular weight | | 31,000 | 2,800,000 | 1,500,000 | 142,000 | 41,000 |
| | Molting peak temperature Tm (K) | | 318 | 331 | 331 | 321 | 332 |
| | Softening point Ta (K) | | 311 | 328 | 329 | 317 | 328 |
| | Molting enthalpy ⊿Tj (mJ/mg) | | 38 | 21 | 23 | 33 | 37 |
| | Half-width of the melting peak ⊿Tp (K) | | 3.5 | 5.8 | 6.1 | 4.3 | 5.3 |
| | Acid value | | 0 | 0 | 0 | 0 | 0 |
| | ⊿Tj/⊿Tp | | 10.9 | 3.6 | 3.8 | 7.7 | 7.0 |
| | Tm/Ts | | 1.16 | 1.05 | 1.04 | 1.09 | 1.07 |
| | G'Tm − 10 (Pa) | | 9.00E+07 | 9.10E+08 | 8.80E+08 | 2.20E+08 | 1.80E+08 |
| | G'Tm + 30 (Pa) | | 5.50E+04 | 7.25E+04 | 6.83E+04 | 7.50E+03 | 2.30E+03 |
| | ln(G'Tm − 10)/ln(G'Tm + 30) | | 1.7 | 1.8 | 1.9 | 2.2 | 2.5 |

TABLE 3

| | | Comparative Production Example 1 | Comparative Production Example 2 | Comparative Production Example 3 | Comparative Production Example 4 | Comparative Production Example 5 | Comparative Production Example 6 | Comparative Production Example 7 | Comparative Production Example 8 | Comparative Production Example 9 |
|---|---|---|---|---|---|---|---|---|---|---|
| | Polymer | A'1 | A'2 | A'3 | A'4 | A'5 | A'6 | A'7 | A'8 | A'9 |
| Monomer (a) | Octadecyl acrylate (C18) | 100 | — | — | — | — | — | — | — | — |
| | Behenyl acrylate (C22) | — | 50 | — | — | 50 | 50 | — | — | — |
| | Behenyl methacrylate (C22) | — | — | — | — | — | — | — | — | — |
| | Myricyl acrylate (C30) | — | — | — | — | — | — | — | — | — |
| | Octacosyl acrylate (C28) | — | — | — | — | — | — | — | — | — |
| Monomer (b) | Acrylonitrile | — | — | 25 | 30 | — | 21 | — | — | — |
| | Acrylamide | — | — | — | — | 40 | — | — | — | — |
| | BANI-M | — | — | — | — | — | — | — | — | — |
| | Desmolux XP 2740 | — | — | — | — | — | — | — | — | — |
| | TAIC | — | — | — | — | — | — | — | — | — |
| | Reaction product of MOI and methanol (functional group equivalent: 201) | — | 1.9 | 1.9 | — | — | 1.9 | — | — | — |
| | Reaction product of MOI and behenyl alcohol (functional group equivalent: 481) | — | 0.6 | 0.6 | — | — | 0.6 | — | — | — |
| | Reaction product of HEMA and octadecyl monoisocyanate (functional group equivalent: 426) | — | — | — | — | — | — | — | — | — |
| Monomer (c) | Reaction product of MOI and dibutylamine (functional group equivalent: 284) | — | — | — | — | — | — | — | — | — |
| Other monomer (d) | Vinylbenzene | — | — | 25 | 50 | 10 | 21 | — | — | 80 |
| | Methyl acrylate | — | — | — | — | — | — | — | — | — |
| | Methyl methacrylate | — | 50 | — | 18 | — | 6.5 | — | — | 18 |
| | Methacrylic acid | — | — | — | 2 | — | — | — | — | 2 |
| | Acrylic acid | — | — | — | — | — | — | — | — | — |
| | Divinylbenzene | — | — | 50 | — | — | — | — | — | — |
| | Hexadecyl acrylate (C16) | — | — | — | — | — | — | 600 | 466 | — |
| | Eleminol JS-2 | — | — | — | — | — | — | 100 | 341 | — |
| Others | Bisphenol A propylene oxide (2 mol) adduct | — | — | — | — | — | — | 220 | 247 | — |
| | Bisphenol A ethylene oxide (2 mol) adduct | — | — | — | — | — | — | 3 | 3 | — |
| | Terephthalic acid | — | — | — | — | — | — | 20 | 74 | — |
| | Dibutyltin oxide | — | — | — | — | — | — | — | — | — |
| | Tetrabutyl titanate | — | — | — | — | — | — | — | — | — |
| | Trimellitic anhydride | — | — | — | — | — | — | — | — | — |
| | Perbutyl O | 0.350 | 0.359 | 0.359 | 0.359 | 0.350 | 0.353 | — | — | 0.350 |
| | Percadox 12-XL25 | — | — | — | — | — | — | — | — | — |
| | 1-di-t-Butylperoxy-3,3,5-trimethylcyclohexane First time | — | — | — | — | — | — | — | — | — |
| | Second time | — | — | — | — | — | — | — | — | — |
| | Toluene (initial feeding) | 44 | 46 | 46 | 46 | 45 | 44 | — | — | 44 |
| | Toluene (monomer diluent) | 22 | 23 | 23 | 23 | 22 | 22 | — | — | 22 |
| Physical properties | Weight ratio of structural unit derived from monomer (a) based on the weight of polymer (A) | 100% | 49% | 0% | 0% | 50% | 50% | 0% | 0% | 0% |
| | $\|SP(x) - SP(a)\|(cal/cm^3)^{0.5}$ | — | 1.0 | — | — | 8.6 | 3.5 | — | — | — |

TABLE 3-continued

|  |  | Comparative Production Example 1 | Comparative Production Example 2 | Comparative Production Example 3 | Comparative Production Example 4 | Comparative Production Example 5 | Comparative Production Example 6 | Comparative Production Example 7 | Comparative Production Example 8 | Comparative Production Example 9 |
|---|---|---|---|---|---|---|---|---|---|---|
| Analysis value | Weight average molecular weight | 112,300 | 100,500 | 112,000 | 138,000 | Unmeasurable | Unmeasurable | 18,000 | 6,500 | 86,000 |
| | Melting peak temperature Tm (K) | 319 | 308 | 295 | Unmeasurable | 335 | 311 | Unmeasurable | Unmeasurable | Unmeasurable |
| | Softening point Ts (K) | 315 | 299 | 291 | Unmeasurable | 329 | 305 | Unmeasurable | Unmeasurable | Unmeasurable |
| | Melting enthalpy, Tj (mJ/mg) | 75 | 3.2 | 30 | Unmeasurable | 0 | 42 | Unmeasurable | Unmeasurable | Unmeasurable |
| | Half-width of the melting peak, Tp (K) | 1.8 | 10.5 | 2.8 | 12 | 21 | 15 | 12 | 38 | 13 |
| | Acid value | 0 | 0 | 0 | Unmeasurable | 0 | 43 | Unmeasurable | Unmeasurable | Unmeasurable |
| | Tj/Tp | 41.7 | 0.3 | 10.7 | Unmeasurable | 2.8 | 2.3 | Unmeasurable | Unmeasurable | Unmeasurable |
| | Tm/Ts | 1.10 | 1.35 | 1.22 | Unmeasurable | 1.11 | 1.19 | Unmeasurable | Unmeasurable | Unmeasurable |
| | G'Tm − 10 (Pa) | 1.10E+07 | 1.30E+06 | Unmeasurable | Unmeasurable | Unmeasurable | Unmeasurable | Unmeasurable | Unmeasurable | Unmeasurable |
| | G'Tm + 30 (Pa) | Unmeasurable | 8.00E+02 | 600 or less | Unmeasurable | Unmeasurable | Unmeasurable | Unmeasurable | Unmeasurable | Unmeasurable |
| | ln(G'Tm − 10)/ln(G'Tm + 30) | — | 2.1 | — | — | — | 2.6 | — | — | — |

The weight average molecular weights of the polymers (A) and (A') were measured by GPC under the above conditions.

The melting peak temperature Tm (K), softening point Ts (K), melting enthalpy ΔTj (mJ/mg), and half-width of the melting peak ΔTp of the polymer (A) were measured using a differential scanning calorimeter (Seiko Instruments Inc., DSC 210 or the like) under the following conditions.

<Measurement Conditions>
(1) Temperature maintained at 30° C. for 10 minutes
(2) Temperature increased to 150° C. at 10° C./min
(3) Temperature maintained at 150° C. for 10 minutes
(4) Temperature cooled to 0° C. at 10° C./min
(5) Temperature maintained at 0° C. for 10 minutes
(6) Temperature increased to 150° C. at 10° C./min Each endothermic peak observable in the process of (6) is analyzed.

The G'$_{Tm-10}$ (Pa) and G'$_{Tm+30}$ (Pa) of the polymer (A) were measured using the following viscoelastic meter, under the following conditions. In the table, "600 or less" indicates 6.0 E+02 Pa or less, and "Unmeasurable" indicates that measurement was impossible.

Device: ARES-24A (Rheometric Scientific Ltd.)
Jig: 25 mm parallel plate
Frequency: 1 Hz
Strain rate: 5%
Heating rate: 5° C./rain Examples 1 to 31 and Comparative Examples 1 to 6

Using the polymers (A1) to (A31) obtained in Production Examples 1 to 31 as electrophotographic toner binders (B1) to (B31), respectively, and the polymers (A'1) to (A'6) obtained in Comparative Production Examples 1 to 6 as comparative electrophotographic toner binders (B'1) to (B'6), respectively, each toner binder was evaluated for viscoelasticity and storage stability. Tables 4 to 6 show the results. Evaluation methods are described below.

TABLE 4

|  |  | Example 1 | Example 2 | Example 3 | Example 4 | Example 5 | Example 6 | Example 7 | Example 8 |
|---|---|---|---|---|---|---|---|---|---|
| Toner binder evaluation results | Toner binder | B1 | B2 | B3 | B4 | B5 | B6 | B7 | B8 |
|  | High-temperature storage modulus G' (380 K) | 6.9E+03 | 3.3E+03 | 4.5E+03 | 9.3E+03 | 6.3E+03 | 6.9E+04 | 1.3E+04 | 2.9E+04 |
|  | Low-temperature loss modulus G" (353 K) | 2.5E+03 | 7.7E+02 | 6.7E+02 | 2.7E+03 | 7.0E+02 | 3.1E+04 | 2.7E+03 | 1.8E+04 |
|  | Binder's low-temperature fixability evaluation | Good | Good | Good | Good | Good | Good | Good | Good |
|  | Binder's hot-offset resistance evaluation | Good | Good | Good | Good | Good | Excellent | Excellent | Excellent |
|  | Binder's storage stability evaluation | Good | Good | Good | Good | Good | Good | Good | Good |
|  | Binder's blocking resistance evaluation | Excellent | Excellent | Excellent | Excellent | Excellent | Excellent | Excellent | Excellent |

|  |  | Example 9 | Example 10 | Example 11 | Example 12 | Example 13 | Example 14 | Example 15 |
|---|---|---|---|---|---|---|---|---|
| Toner binder evaluation results | Toner binder | B9 | B10 | B11 | B12 | B13 | B14 | B15 |
|  | High-temperature storage modulus G' (380 K) | 3.0E+04 | 8.4E+03 | 1.4E+04 | 2.3E+04 | 6.9E+03 | 7.5E+03 | 9.3E+03 |
|  | Low-temperature loss modulus G" (353 K) | 8.8E+03 | 2.3E+03 | 2.8E+03 | 1.2E+04 | 1.0E+03 | 1.1E+03 | 1.7E+03 |
|  | Binder's low-temperature fixability evaluation | Good | Good | Good | Good | Good | Good | Good |
|  | Binder's hot-offset resistance evaluation | Excellent | Good | Excellent | Excellent | Good | Good | Good |
|  | Binder's storage stability evaluation | Good | Good | Good | Good | Good | Good | Good |
|  | Binder's blocking resistance evaluation | Excellent | Excellent | Excellent | Excellent | Excellent | Excellent | Excellent |

TABLE 5

|  |  | Example 16 | Example 17 | Example 18 | Example 19 | Example 20 | Example 21 | Example 22 | Example 23 |
|---|---|---|---|---|---|---|---|---|---|
| Toner binder evaluation results | Toner binder | B16 | B17 | B18 | B19 | B20 | B21 | B22 | B23 |
|  | High-temperature storage modulus G' (380 K) | 6.3E+03 | 3.0E+03 | 9.3E+03 | 9.1E+04 | 1.0E+04 | 6.0E+02 | 1.1E+04 | 1.6E+03 |
|  | Low-temperature loss modulus G" (353 K) | 1.3E+03 | 4.6E+02 | 1.7E+03 | 2.7E+05 | 3.0E+04 | 1.8E+03 | 3.3E+04 | 4.8E+03 |
|  | Binder's low-temperature fixability evaluation | Good | Good | Good | Good | Good | Good | Good | Good |
|  | Binder's hot-offset resistance evaluation | Good | Good | Good | Excellent | Excellent | Good | Excellent | Good |
|  | Binder's storage stability evaluation | Good | Good | Good | Good | Good | Good | Good | Good |
|  | Binder's blocking resistance evaluation | Good | Average | Excellent | Excellent | Excellent | Average | Excellent | Good |

TABLE 5-continued

|  |  | Example 24 | Example 25 | Example 26 | Example 27 | Example 28 | Example 29 | Example 30 | Example 31 |
|---|---|---|---|---|---|---|---|---|---|
| Toner binder evaluation results | Toner binder | B24 | B25 | B26 | B27 | B28 | B29 | B30 | B31 |
|  | High-temperature storage modulus G' (380 K) | 3.5E+04 | 7.0E+04 | 9.1E+04 | 1.0E+04 | 2.5E+03 | 5.2E+04 | 4.4E+04 | 1.3E+04 |
|  | Low-temperature loss modulus G" (353 K) | 1.1E+05 | 2.1E+05 | 2.7E+05 | 3.0E+04 | 7.5E+03 | 1.6E+05 | 1.3E+05 | 2.6E+03 |
|  | Binder's low-temperature fixability evaluation | Good | Good | Good | Good | Good | Good | Good | Good |
|  | Binder's hot-offset resistance evaluation | Excellent | Excellent | Excellent | Excellent | Good | Excellent | Excellent | Excellent |
|  | Binder's storage stability evaluation | Good | Good | Good | Good | Good | Good | Good | Good |
|  | Binder's blocking resistance evaluation | Excellent | Excellent | Excellent | Excellent | Excellent | Excellent | Excellent | Excellent |

TABLE 6

|  |  | Comparative Example 1 | Comparative Example 2 | Comparative Example 3 | Comparative Example 4 | Comparative Example 5 | Comparative Example 6 |
|---|---|---|---|---|---|---|---|
| Toner binder evaluation results | Toner binder | B'1 | B'2 | B'3 | B'4 | B'5 | B'6 |
|  | High-temperature storage modulus G' (380 K) | Unmeasurable | Unmeasurable | Unmeasurable | 3.50E+04 | Unmeasurable | 8.60E+05 |
|  | Low-temperature loss modulus G" (353 K) | Unmeasurable | Unmeasurable | 1.72E+03 | 3.30E+06 | Unmeasurable | 1.10E+04 |
|  | Binder's low-temperature fixability evaluation | Poor | Poor | Good | Poor | Poor | Good |
|  | Binder's hot-offset resistance evaluation | Poor | Poor | Poor | Excellent | Poor | Excellent |
|  | Binder's storage stability evaluation | Good | Poor | Poor | Unevaluable | Good | Poor |
|  | Binder's blocking resistance evaluation | Good | Poor | Poor | Excellent | Excellent | Poor |

<Evaluation of Low-Temperature Fixability of Toner Binder>

Under similar conditions as used for the polymer (A), the low-temperature loss modulus G" at 353 K, i.e., low-temperature loss modulus G" (353 K), of the electrophotographic toner binder (B) was measured using a viscoelastic meter under the conditions described above.

The low-temperature fixability is predictable to a certain degree by measuring the loss modulus G" of the toner binder. With a fixing device used for the present evaluation, the low-temperature fixability of the resulting toner was most highly correlated with the loss modulus G" of the toner binder at 353 K, and thus a value of the loss modulus at 353 K (G" (353 K)) was used for evaluation as follows.

[Criteria]

4.0 E+02 Pa to 3.0 E+05 Pa: A

Less than 4.0 E+02 Pa, or more than 3.0 E+05 Pa: F

When G" (353 K) is in the range of 4.0 E+02 Pa to 3.0 E+05 Pa, the resulting toner has good low-temperature fixability.

When G" (353 K) is less than 4.0 E+02 Pa, offset easily occurs due to too low viscosity. When G" (353 K) is more than 3.0 E+05 Pa, cold offset easily occurs due to insufficiently low viscosity.

<Evaluation of Hot-Offset Resistance of Toner Binder>

Under similar conditions as used for the polymer (A), the storage modulus G' at 380 K, i.e., high-temperature storage modulus G' (380 K), of the electrophotographic toner binder (B) was measured using a viscoelastic meter under the conditions described above.

The hot-offset resistance is predictable to a certain degree by measuring the storage modulus G' of the toner binder. With the fixing device used for the present evaluation, the hot offset temperature of the resulting toner was most highly correlated with the storage modulus G' of the toner binder at 380 K, and thus a value of the high-temperature storage modulus G' (380 K) was used for evaluation as follows.

[Criteria]

1.0 E+04 Pa or more: Excellent 6.0 E+02 Pa or more and less than 1.0 E+04 Pa: Good Less than 6.0 E+02 Pa: Poor When the high-temperature storage modulus G' (380 K) is less than 6.0 E+02 Pa, offset easily occurs due to too low elasticity, resulting in poor hot-offset resistance. When the high-temperature storage modulus G' (380 K) is 6.0 E+02 Pa or more, the resulting toner has good hot-offset resistance and a sufficient fixing width can be achieved.

<Evaluation of Storage Stability of Toner Binder>

Under similar conditions as used for the polymer (A), the melting peak temperature Tm (K) of the electrophotographic toner binder (B) was measured, and evaluated as follows.

[Criteria]

Tm of 313 K or higher: Good storage stability

Tm of lower than 313 K: Poor storage stability

A toner binder having a Tm of 313 K or higher results in a toner having good storage stability. A toner binder having a Tm lower than 313 K results in a toner having poor storage stability.

<Evaluation of Blocking Resistance of Toner Binder>

The electrophotographic toner binder (B) was pulverized into fine particles using a jet mill or the like, and these particles were further classified, thus obtaining fine particles having a volume average particle size (D50) of 10±1 μm and a particle size distribution Dv50/Dn50 of 1.15 to 1.20. Hydrophobic silica (Nippon Aerosil Co., Ltd., R972) (1 part) was externally added by a Henschel mixer to 100 parts by weight of the fine particles which were then passed through a 150 mesh sieve. The volume average particle size and the particle size distribution can be measured by methods similar to those for the toner (described later), using a Coulter counter. The fine particles of the toner binder with such external addition were allowed to stand in a humidity and temperature controller set at 60% humidity and 313 K for 24 hours.

The state of aggregation was visually checked. Then, using a powder tester, the fine particles (5 g) were sampled on a 150 μm mesh sieve, and the sample was sieved at an amplitude of 2 mm for two minutes to evaluate the blocking resistance of the toner binder based on the following criteria.
[Criteria]
No blocking and no particles left on sieve: Excellent
Partial blocking but no particles left on sieve: Good
Overall blocking but no particles left on sieve: Average
Aggregated particles left on sieve: Poor The electrophotographic toner binders (B1) to (B31) of the present invention have good low-temperature fixability, hot-offset resistance, storage stability, and blocking resistance.

Yet, each of the comparative electrophotographic toner binders (B'1) to (B'6) was poorly evaluated in at least one of low-temperature fixability, hot-offset resistance, storage stability, or blocking resistance.

Examples 32 to 39

A toner composition was produced using the polymer (A18) obtained in Production Example 18 by the following method.

Example 32: Production of Toner Composition (Tf18) by Kneading-Pulverizing Method A mixture of the polymer (A18) (85 parts), carbon black "MA-100" (Mitsubishi Chemical Corporation) (6 parts) as a pigment, carnauba wax (4 parts) as a release agent, and a charge control agent "T-77" (Hodogaya Chemical Co., Ltd.) (4 parts) was processed into a toner by the following method. First, the raw materials were pre-mixed using a Henschel mixer (Mitsui Miike Machinery Co., Ltd., FM10B), and then kneaded with a twin-screw kneader (Ikegai Corp., PCM-30). The kneaded product was finely pulverized by using a supersonic jet mill "Labo Jet" (Nippon Pneumatic Mfg. Co., Ltd.), and classified by an airflow separator (Nippon Pneumatic Mfg. Co., Ltd., MDS-I). Thus, colored polymer particles (Cf18) were obtained.

Then, the colored polymer particles (Cf18) (100 parts) was mixed with colloidal silica (Aerosil R972: Nippon Aerosil Co., Ltd.) (1 part) as a fluidizing agent, using a sample mill. Thus, a toner composition (Tf18) was obtained.

Example 33: Production of Toner Composition (Tf19) by Kneading-Pulverizing Method Colored polymer particles (Cf19) and a toner composition (Tf19) were obtained as in Example 32, except that the polymer (A18) (1.7 parts), the polymer (A'8) (58.3 parts), and the polymer (A'9) (25 parts) were used instead of the polymer (A18) (85 parts).

Example 34: Production of Toner Composition (Tf20) by Kneading-Pulverizing Method Colored polymer particles (Cf20) and a toner composition (Tf20) were obtained as in Example 32, except that the polymer (A18) (4.2 parts), the polymer (A'8) (56.6 parts), and the polymer (A'9) (24.2 parts) were used instead of the polymer (A18) (85 parts).

Example 35: Production of Toner Composition (Tf21) by Kneading-Pulverizing Method Colored polymer particles (Cf21) and a toner composition (Tf21) were obtained as in Example 32, except that the polymer (A18) (8.5 parts), the polymer (A'8) (53.6 parts), and the polymer (A'9) (22.9 parts) were used instead of the polymer (A18) (85 parts).

Example 36: Production of Toner Composition (Tf22) by Kneading-Pulverizing Method Colored polymer particles (Cf22) and a toner composition (Tf22) were obtained as in Example 32, except that the polymer (A18) (17 parts), the polymer (A'8) (47.6 parts), and the polymer (A'9) (20.4 parts) were used instead of the polymer (A18) (85 parts).

Example 37: Production of Toner Composition (Tf23) by Kneading-Pulverizing Method Colored polymer particles (Cf23) and a toner composition (Tf23) were obtained as in Example 32, except that the polymer (A18) (8.5 parts) and the polymer (A'10) (76.5 parts) were used instead of the polymer (A18) (85 parts).

Comparative Examples 7 to 9

Comparative toner compositions were produced by the following method, using the polymers (A'5), (A'7), and (A'9) obtained in Comparative Production Examples 5, 7, and 9, respectively.

Comparative Example 7: Production of Toner Composition (Tf'5) by Kneading-Pulverizing Method Colored polymer particles (Cf'5) and a comparative toner composition (Tf'5) were obtained as in Example 32, except that the polymer (A'5) was used instead of the polymer (A18).

Comparative Example 8: Production of Toner Composition (Tf'7) by Kneading-Pulverizing Method Colored polymer particles (Cf'7) and a comparative toner (Tf'7) were obtained as in Example 32, except that the polymer (A'7) (59.5 parts) and the polymer (A'9) (25.5 parts) were used instead of the polymer (A18) (85 parts).

Comparative Example 9: Production of Toner Composition (Tf'9) by Kneading-Pulverizing Method Colored polymer particles (Cf'9) and a comparative toner composition (Tf'9) were obtained as in Example 32, except that a polymer (A'9) was used instead of the polymer (A18).

Example 38: Production of Toner Composition (Ts18) by Dissolution Suspension Method

[Production of Fine Particle Dispersion 1]
To a reaction vessel equipped with a stirring rod and a thermometer were added water (683 parts), a sodium salt of methacrylic acid EO adduct sulfate ester (Eleminol RS-30, Sanyo Chemical Industries, Ltd.) (11 parts), vinylbenzene (139 parts), methacrylic acid (138 parts), butyl acrylate (184 parts), and ammonium persulfate (1 part), followed by stirring at 400 revolutions/min for 15 minutes. Thus, a white emulsion was obtained. The system temperature was heated to 75° C. for reaction for five hours. Further, a 1% aqueous solution of ammonium persulfate (30 parts) was added, followed by aging at 75° C. for five hours. Thus, a fine particle dispersion 1, which is an aqueous vinyl polymer dispersion (copolymer of vinylbenzene-methacrylic acid-butyl acrylate-sodium salt of methacrylic acid EO adduct sulfate ester), was obtained. The fine particle dispersion 1 had a volume average particle size of 0.15 µm as measured with a laser diffraction/scattering type particle size distribution analyzer (HORIBA, Ltd., LA-920).

[Production of MB1]

Water (1200 parts), carbon black (Cabot Corporation, Regal 400R) (40 parts), and the polymer (A18) (20 parts) produced in Production Example 18 were mixed with a Henschel mixer (Mitsui Mining Co., Ltd.), and the mixture was kneaded with a triple roll mill at 90° C. for 30 minutes, followed by roll cooling and pulverization by a pulverizer. Thus, a pigment masterbatch (MB1) was obtained.

[Production of Aqueous Phase s1]

To a vessel equipped with a stirring rod were added water (955 parts), the fine particle dispersion 1 (15 parts), and an aqueous solution of sodium dodecyl diphenyl ether disulfonate (Eleminol MON7, Sanyo Chemical Industries, Ltd.) (30 parts). Thus, a milky white liquid, i.e., an aqueous phase s1, was obtained.

[Production of Wax Dispersion 1]

To a reaction vessel equipped with a condenser, a thermometer, and a stirrer were added carnauba wax (15 parts) and ethyl acetate (85 parts), followed by heating to 80° C. to dissolve the components. Then, the resulting product was cooled to 30° C. over one hour to crystallize the carnauba wax into fine particles which were further wet-pulverized by "Ultravisco-Mill" (Aimex Co., Ltd.). Thus, a wax dispersion 1 was produced.

[Production of Toner Composition (Ts18)]

To a beaker were added the polymer (A18) (191 parts) produced in Production Example 18, the pigment masterbatch (MB1) (25 parts), the wax dispersion 1 (67 parts), and liquid ethyl acetate (124 parts), followed by dissolution and homogeneous mixing. Thus, an oil phase s18 was obtained. The aqueous phase s1 (600 parts) was added to the oil phase s18, and dispersed using a TK homomixer (Tokushu Kika Kogyo Co., Ltd.) at a rotating speed of 12000 rpm at 25° C. for one minute, followed by desolvation using a film evaporator at a pressure reduction degree of −0.05 MPa (gauge pressure), a temperature of 40° C., and a rotating speed of 100 rpm for 30 minutes. Thus, an aqueous colored polymer dispersion (X18) was obtained.

The dispersion (X18) (100 parts) was centrifuged. Further, water (60 parts) was added, and the mixture was centrifuged for solid-liquid separation. This process was repeated twice, and then the resulting product was dried at 35° C. for one hour. Subsequently, using a classifier (Elbow-Jet (Matsubo Corporation)), fine particles and coarse particles were removed such that the fine particles having a size of 3.17 µm or less account for 12% by number or less and the coarse particles having a size of 8.0 µm or more account for 3% by volume or less. Thus, colored polymer particles (Cs18) were obtained.

Next, colloidal silica (Aerosil R972: Nippon Aerosil Co., Ltd.) (1 part) was added to the colored polymer particles (Cs18) (100 parts). These components were mixed together at a peripheral speed of 15 m/sec for 30 seconds, followed by a one-minute pause. This cycle was repeated five times. Thus, a toner composition (Ts18) was obtained.

Comparative Example 10: Production of Comparative Toner Composition (Ts'2) by Dissolution Suspension Method An oil phase s'2, colored polymer particles (Cs'2), and a comparative toner composition (Ts'2) were obtained as in Example 38, except that the polymer (A'2) was used instead of the polymer (A18).

Comparative Example 11: Production of Comparative Toner Composition (Ts'4) by Dissolution Suspension Method An oil phase s'4, colored polymer particles (Cs'4), and a comparative toner composition (Ts'4) were obtained as in Example 38, except that the polymer (A'4) was used instead of the polymer (A18).

Example 39: Production of Toner Composition (Tu18) by Suspension Polymerization Method A toner composition containing a polymer with the same raw material composition (i.e., the constituent monomers and the ratio thereof are the same) as that of the polymer (A18) obtained in Production Example 18 was produced by the following suspension polymerization method.

[Production of Aqueous Phase u2]

A 0.1 M aqueous solution of trisodium phosphate (510 parts) was added to ion-exchanged water (650 parts) and heated to 60° C., followed by stirring using a TK homomixer (Tokushu Kika Kogyo Co., Ltd.) at 12000 rpm for five minutes. Further, a 1.0 M aqueous solution of calcium chloride (75 parts) was slowly added to ensure dissolution. Thus, an aqueous phase u2 was obtained.

[Production of Oil Phase u18]

Behenyl acrylate (186 parts), vinylbenzene (93 parts), acrylonitrile (93 parts), methacrylic acid (7.4 parts), Karenz MOI (7.1 parts), Eleminol JS-2 (1.9 parts), dibutylamine (6.0 parts), pigment masterbatch (MB1) (24 parts), di-t-butylsalicylic acid aluminum (5 parts), di-t-butylsalicylic acid (0.25 parts), and carnauba wax (10 parts) were mixed and heated to 60° C., followed by uniform dissolution and dispersion using a TK homomixer at 12000 rpm. A polymerization initiator, 2,2'-azobis(2,4-dimethylvaleronitrile) (14 parts), was dissolved in the dispersion. Thus, an oil phase u18 was prepared.

[Production of Toner Composition (Tu18)]

The oil phase u18 was added to the aqueous phase u2, followed by stirring at 60° C. under a nitrogen atmosphere, using a TK homomixer at 10000 rpm for 22 minutes. Subsequently, the mixture was heated to 80° C. under stirring with a paddle stirring blade for reaction for 10 hours. After completion of polymerization reaction, the resulting product was cooled, and hydrochloric acid was added to dissolve calcium phosphate, followed by filtration, washing with water, and drying. Thus, dried colored polymer particles (Cu18) containing the polymer (A18) were obtained.

Next, colloidal silica (Aerosil R972: Nippon Aerosil Co., Ltd.) (1 part) was added to the colored polymer particles (Cu18) (100 parts) obtained in the form of colored powder. These components were mixed together at a peripheral speed of 15 m/sec for 30 seconds, followed by a one-minute pause. This cycle was repeated five times. Thus, a toner composition (Tu18) having the polymer (A18) was obtained.

The toner compositions (Tf18) to (Tf23), (Ts18), and (Tu18) obtained in Examples 32 to 39, respectively, and the toner composition for comparisons (Tf'5), (Tf'7), (Tf'9), (Ts'2), and (Ts'4) obtained in Comparative Examples 7 to 11, respectively, were evaluated by the following methods for the particle size, viscoelasticity, low-temperature fixability, hot-offset resistance, and storage stability test (blocking test). Table 7 shows the results.

TABLE 7

| | | Example 32 | Example 33 | Example 34 | Example 35 | Example 36 | Example 37 | Example 38 |
|---|---|---|---|---|---|---|---|---|
| | Toner composition | Tf 18 | Tf 19 | Tf20 | Tf21 | Tf22 | Tf23 | Ts18 |
| | Toner forming method | Kneading-pulverizing | Kneading-pulverizing | Kneading-pulverizing | Kneading-pulverizing | Kneading-pulverizing | Kneading-pulverizing | Dissolution suspension |
| Production raw materials | Wax dispersion | — | — | — | — | — | — | Wax dispersion 1 |
| | Fine particle dispersion | — | — | — | — | — | — | Fine particle dispersion 1 |
| | Aqueous phase | — | — | — | — | — | — | Aqueous phase s1 |
| | Oil phase | — | — | — | — | — | — | Oil phase s18 |
| | Pigment masterbatch | — | — | — | — | — | — | MB 1 |
| Composition | Pigment | MA-100 | MA-100 | MA-100 | MA-100 | MA-100 | MA-100 | 400R |
| | Wax | Carnauba wax | Carnauba wax | Carnauba wax | Carnauba wax | Carnauba wax | Carnauba wax | Carnauba wax |
| | Fluidizing agent | R972 | R972 | R972 | R972 | R972 | R972 | R972 |
| | Binder type | A18 | A18/A'8/A'9 | A18/A'8/A'9 | A18/A'8/A'9 | A18/A'8/A'9 | A18/A'10 | A18 |
| | Binder ratio (%) | 100 | 1.7/58.3/25 | 4.2/56.6/24.2 | 8.5/53.6/22.9 | 17/47.6/20.4 | 8.5/76.5 | 100 |
| Evaluation results | Particle size (um) | 7.0 | 7.2 | 6.8 | 6.9 | 6.4 | 7.3 | 5.9 |
| | High-temperature storage modulus G' (380 K) | 1.0E+04 | 2.1E+04 | 2.0E+04 | 1.1E+04 | 9.0E+03 | 5.1E+04 | 1.1E+04 |
| | Low-temperature loss modulus G'' (353 K) | 2.8E+03 | 1.1E+05 | 8.0E+05 | 6.1E+05 | 5.5E+05 | 8.2E+05 | 2.1E+03 |
| | MFT (° C.) | 90 | 125 | 120 | 115 | 105 | 120 | 85 |
| | Hot offset temperature (° C.) | 180 or more | 180 or more | 180 or more | 180 or more | 170 | 180 or more | 180 or more |
| | Storage stability test | Good | Good | Good | Good | Good | Good | Good |

| | | Example 39 | Comparative Example 7 | Comparative Example 8 | Comparative Example 9 | Comparative Example 10 | Comparative Example 11 |
|---|---|---|---|---|---|---|---|
| | Toner composition | Tu18 | Tf'5 | Tf'7 | Tf'9 | Ts'2 | Ts'4 |
| | Toner forming method | Suspension polymerization | Kneading-pulverizing | Kneading-pulverizing | Kneading-pulverizing | Dissolution suspension | Dissolution suspension |
| Production raw materials | Wax dispersion | — | — | — | — | Wax dispersion 1 | Wax dispersion 1 |
| | Fine particle dispersion | — | — | — | — | Fine particle dispersion 1 | Fine particle dispersion 1 |
| | Aqueous phase | Aqueous phase u2 | — | — | — | Aqueous phase s1 | Aqueous phase s1 |
| | Oil phase | Oil phase u18 | — | — | — | Oil phase s'2 | Oil phase s'4 |
| | Pigment masterbatch | MB 1 | — | — | — | MB1 | MB1 |
| Composition | Pigment | 400R | MA-100 | MA-100 | MA-100 | R400 | R400 |
| | Wax | Carnauba wax | Carnauba wax | Carnauba wax | Carnauba wax | Carnauba wax | Carnauba wax |
| | Fluidizing agent | R972 | R972 | R972 | R972 | R972 | R972 |
| | Binder type | A18 | A'5 | A'7/A'8 | A'9 | A'2 | A'4 |
| | Binder ratio (%) | 100 | 100 | 59.5/25.5 | 100 | 100 | 100 |
| Evaluation results | Particle size (um) | 6.2 | 6.8 | 6.9 | 6.5 | 5.8 | 6.1 |
| | High-temperature storage modulus G' (380 K) | 2.3E+04 | 2.2E+04 | 2.1E+04 | 1.0E+05 | 600 or less | 2.6E+04 |
| | Low-temperature loss modulus G'' (353 K) | 3.6E+03 | 5.2E+06 | 1.2E+06 | 8.2E+06 | 600 or less | 3.6E+06 |
| | MFT (° C.) | 90 | 130 | 130 | 145 | No fixing | 130 |
| | Hot offset temperature (° C.) | 180 or more | 180 or more | 180 or more | 180 or more | No fixing | 180 or more |
| | Storage stability test | Good | Good | Good | Good | Poor | Good |

<Particle Size>

The particle size of the toner composition was measured by the following method.

About 0.1 g of the toner composition sample was weighed into a beaker, and Dry Well (FUJIFILM Corporation) (2 mL) as a dispersant and ion-exchanged water (4 mL) were added to the beaker, followed by dispersion using a 20 W or more ultrasonic disperser for three minutes. Then, Isoton II (10 to 30 mL) was further added, again followed by dispersion using the 20 W or more ultrasonic disperser for three minutes. Then, quickly, using a particle size analyzer (Beckman Coulter, Inc., product name: Multisizer III), the volume average particle size (Dv50) was measured under the following conditions: aperture diameter: 100 µm; medium: electrolyte solution (Isoton II); number of particles to be measured: 100,000. The thus-obtained value was regarded as the particle size (µm) of the toner composition.

<Viscoelasticity (Storage Modulus and Loss Modulus) of Toner Composition>

The storage modulus and loss modulus of the toner composition of the present invention were measured using the following viscoelastic meter under the following conditions. The storage modulus at 380 K was regarded as the "high-temperature storage modulus G' (380 K)" and the loss modulus at 353 K was regarded as the "low-temperature loss modulus G" (353 K)".

[Measurement Conditions]
Device: ARES-24A (Rheometric Scientific Ltd.)
Jig: 25 mm parallel plate
Frequency: 1 Hz
Strain rate: 5%
Heating rate: 5° C./rain <Low-Temperature Fixability and Hot-Offset Resistance>

The toner composition was uniformly placed on paper such that the weight per unit area was 0.6 mg/cm². Here, the powder was placed on the paper using a printer from which a heat fixing device was removed. The minimum fixing temperature (MFT) and the hot offset temperature when this paper was moved by a pressure roller at a fixing speed (heating roller peripheral speed) of 213 mm/sec and a fixing pressure (pressure of the roller pressure) of 5 kg/cm² were measured. A lower MFT indicates better low-temperature fixability. In Table 7, "No fixing" in "MFT" or "Hot offset temperature" means that the MFT or hot offset temperature was unmeasurable.

<Storage Stability Test (Blocking Test)>

The powdered toner was allowed to stand in a drier at a temperature of 316 K for 15 hours. The presence or absence of blocking was visually checked, and the heat-resistance storage stability was evaluated based on the following criteria.

[Criteria]
Good: No blocking occurred.
Poor: Blocking occurred.

The toner compositions (Tf18) to (Tf23), (Ts18), and (Tu18) of the present invention have good low-temperature fixability, hot-offset resistance, and storage stability.

Yet, each of the comparative toner compositions (Tf'5), (Tf'7), (Tf'9), (Ts'2), and (Ts'4) was poorly evaluated in at least one of low-temperature fixability, hot-offset resistance, or storage stability.

INDUSTRIAL APPLICABILITY

The toner composition containing the toner binder of the present invention is excellent in low-temperature fixability, hot-offset resistance, and storage stability, and is thus useful as an electrostatic image development toner for electrophotography, electrostatic recording, electrostatic printing, and the like.

The invention claimed is:

1. An electrophotographic toner composition comprising:
an electrophotographic toner binder, and colorant,
wherein,
a content of the electrophotographic toner binder in the electrophotographic toner composition is 30 to 97% by weight, and the electrophotographic toner binder comprises:
a polymer (A) containing a monomer (a) and a monomer (x) different from the monomer (a) as essential constituent monomers,
wherein the monomer (a) is behenyl (meth)acrylate, the polymer (A) has an acid value of 40 or less, and the polymer (A) satisfies the following relational expression (1):

$$1.1 \ (cal/cm^3)^{0.5} \leq |SP(x)-SP(a)| \leq 8.0 \ (cal/cm^3)^{0.5} \quad \text{relational expression (1):}$$

wherein SP(a) is the solubility parameter (SP value) of a structural unit derived from the monomer (a) constituting the polymer (A); and SP(x) is the SP value of a structural unit derived from the monomer (x) different from the monomer (a) constituting the polymer (A),
wherein an amount of the monomer (a) as a constituent monomer constituting the polymer (A) is 30 to 99% by weight, based on the weight of the polymer (A),
wherein the monomer (x) includes at least one monomer (c) selected from the group consisting of vinylbenzene, methyl methacrylate, and methyl acrylate, and a monomer (b) having an ethylenically unsaturated bond, and at least one functional group selected from the group consisting of a nitrile group, a urethane group, a urea group, an imide group, an allophanate group, an isocyanurate group, and a biuret group, wherein the monomer (b) includes a monomer (b1) having a nitrile group and a monomer (b3) having a urea group.

2. The electrophotographic toner composition according to claim 1, wherein the polymer (A) has a weight average molecular weight of 30,000 or more and 3,000,000 or less.

3. The electrophotographic toner composition according to claim 1, wherein the polymer (A) has a melting peak temperature Tm of 313 to 373 K as measured by DSC, and the polymer (A) satisfies the following relational expression (2):

$$1.6 \leq \ln(G'_{Tm-10})/\ln(G'_{Tm+30}) \leq 2.6 \quad \text{relational expression (2):}$$

wherein $G'_{Tm-10}$ is the storage modulus in Pascals of the polymer (A) when the polymer (A) has a temperature of (Tm−10) K; and $G'_{Tm+30}$ is the storage modulus in Pascals of the polymer (A) when the polymer (A) has a temperature of (Tm+30) K.

4. The electrophotographic toner composition according to claim 1, wherein the polymer (A) satisfies all the following relational expressions (3) to (5):

$$1 \leq \Delta Tj/\Delta Tp \leq 40, \quad \text{relational expression (3):}$$

$$Tm/Ts \leq 1.25, \quad \text{relational expression (4):}$$

$$1.5 \leq \Delta Tp \leq 8.5, \quad \text{relational expression (5):}$$

wherein ΔTj, Tm, Ts, and ΔTp are values obtained by DSC measurement of the polymer (A); ΔTj is the melting enthalpy in mJ/mg; Tm is the melting peak temperature in Kelvin; Ts is the temperature in Kelvin at an intersection of a straight line (a) and a straight line (b) defined below; and ΔTp in Kelvin is the half-width of the melting peak indicating the melting peak temperature,
wherein the straight line (a) is a straight line connecting two temperature points on a DSC curve, wherein a vertical axis represents the heat flow; and a horizontal axis represents the temperature, obtained by DSC measurement of the polymer (A) during heating, wherein the two temperature points being where a value of DDSC, which is a value obtained by differentiating the heat flow with respect to the temperature, is zero immediately before and after a melting peak on the DSC curve, and
wherein the straight line (b) is a tangent line to the DSC curve at a peak top temperature in a DDSC curve, wherein the vertical axis represents the DDSC and the horizontal axis represents the temperature, on a low temperature side of the melting peak.

* * * * *